(12) United States Patent
Shi et al.

(10) Patent No.: US 11,132,402 B2
(45) Date of Patent: Sep. 28, 2021

(54) STREAM COMPUTING METHOD, APPARATUS, AND SYSTEM

(71) Applicant: Huawei Technologies Co., Ltd., Shenzhen (CN)

(72) Inventors: Yunlong Shi, Hangzhou (CN); Fengbin Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 16/261,014

(22) Filed: Jan. 29, 2019

(65) Prior Publication Data

US 2019/0155850 A1 May 23, 2019

Related U.S. Application Data

(63) Continuation of application No. PCT/CN2017/094331, filed on Jul. 25, 2017.

(30) Foreign Application Priority Data

Jul. 29, 2016 (CN) .......................... 201610617253.2

(51) Int. Cl.
  *G06F 16/901* (2019.01)
  *G06F 16/2455* (2019.01)
  (Continued)

(52) U.S. Cl.
  CPC .... *G06F 16/9024* (2019.01); *G06F 16/24568* (2019.01); *G06F 16/284* (2019.01); *H04L 67/10* (2013.01)

(58) Field of Classification Search
  CPC .......... G06F 16/24568; G06F 16/2458; G06F 16/9024; G06F 16/284; H04L 67/10
  See application file for complete search history.

(56) References Cited

U.S. PATENT DOCUMENTS

| 7,103,590 B1 * | 9/2006 | Murthy ............. G06F 16/24553 |
| 8,396,886 B1 * | 3/2013 | Tsimelzon .......... G06F 16/2458 707/769 |

(Continued)

FOREIGN PATENT DOCUMENTS

| CN | 101192239 A | 6/2008 |
| CN | 102915303 A | 2/2013 |

(Continued)

OTHER PUBLICATIONS

Machine Translation and Abstract of Chinese Publication No. CN102915303, Feb. 6, 2013, 18 pages.

(Continued)

*Primary Examiner* — Jesse P Frumkin
(74) *Attorney, Agent, or Firm* — Conley Rose, P.C.

(57) ABSTRACT

A stream computing method applicable to a system including a manager node and a worker node, where the manager node, obtains input channel description information, a structured query language (SQL) statement, and output channel description information, dynamically generates a data stream graph according to the input channel description information, the SQL statement, and the output channel description information, and controlling, according to the data stream graph, a worker node to execute a stream computing task.

18 Claims, 17 Drawing Sheets

(51) Int. Cl.
*G06F 16/28* (2019.01)
*H04L 29/08* (2006.01)

(56) References Cited

U.S. PATENT DOCUMENTS

| | | | |
|---|---|---|---|
| 2005/0080625 A1 | 4/2005 | Bennett et al. | |
| 2007/0214111 A1* | 9/2007 | Jin | G06F 16/258 |
| 2008/0133209 A1 | 6/2008 | Bar-Or et al. | |
| 2008/0177722 A1 | 7/2008 | Lohman et al. | |
| 2008/0281786 A1* | 11/2008 | Duffy | G06F 16/284 |
| 2010/0250572 A1* | 9/2010 | Chen | G06F 16/24568 |
| | | | 707/759 |
| 2011/0040827 A1 | 2/2011 | Katsunuma et al. | |
| 2016/0373494 A1* | 12/2016 | Shi | G06F 9/5083 |
| 2017/0300367 A1* | 10/2017 | Zhang | G06F 9/5083 |

FOREIGN PATENT DOCUMENTS

| | | |
|---|---|---|
| CN | 103870340 A | 6/2014 |
| CN | 103970602 A | 8/2014 |
| CN | 104199831 A | 12/2014 |
| CN | 104504143 A | 4/2015 |
| CN | 104866310 A | 8/2015 |
| CN | 105404690 A | 3/2016 |
| CN | 105786808 A | 7/2016 |
| WO | 2009012403 A2 | 1/2009 |
| WO | 2016088281 A1 | 6/2016 |

OTHER PUBLICATIONS

Machine Translation and Abstract of Chinese Publication No. CN104866310, Aug. 26, 2015, 16 pages.
Machine Translation and Abstract of Chinese Publication No. CN105786808, Jul. 20, 2016, 24 pages.
Foreign Communication From a Counterpart Application, PCT Application No. PCT/CN2017/094331, English Translation of International Search Report dated Nov. 9, 2017, 2 pages.
Foreign Communication From a Counterpart Application, PCT Application No. PCT/CN2017/094331, English Translation of Written Opinion dated Nov. 9, 2017, 4 pages.
Machine Translation and Abstract of Chinese Publication No. CN103970602, Aug. 6, 2014, 13 pages.
Machine Translation and Abstract of Chinese Publication No. CN104199831, Dec. 10, 2014, 40 pages.
Machine Translation and Abstract of Chinese Publication No. CN105404690, Mar. 16, 2016, 23 pages.
Foreign Communication From a Counterpart Application, Chinese Application No. 201610617253.2, Chinese Office Action dated Aug. 5, 2019, 8 pages.
Dayarathna, M., et al., "Automatic optimization of stream programs via source program operator graph transformations," XP35360073, Distrib Parallel Databases, Aug. 10, 2013, pp. 543-599.
Foreign Communication From a Counterpart Application, European Application No. 17833535.2, Extended European Search Report dated Apr. 16, 2019, 10 pages.

* cited by examiner

STREAM COMPUTING METHOD, APPARATUS, AND SYSTEM

CROSS-REFERENCE TO RELATED APPLICATIONS

This application is a continuation of International Patent Application No. PCT/CN2017/094331 filed on Jul. 25, 2017, which claims priority to Chinese Patent Application No. 201610617253.2 filed on Jul. 29, 2016. The disclosures of the aforementioned applications are hereby incorporated by reference in their entireties.

TECHNICAL FIELD

The present disclosure relates to the big data computing field, and in particular, to a stream computing method, apparatus, and system.

BACKGROUND

In application fields such as a finance service, sensor monitoring, and network monitoring, a data stream is real-time, volatile, sudden, disordered, and infinite. As a system that can perform computing processing on a real-time data stream, a stream computing system is increasingly widely applied.

A directed acyclic graph (DAG) may be used to represent processing logic of a streaming application (or generally referred to as a stream application) deployed in the stream computing system, and the DAG is also referred to as a data stream graph. Referring to FIG. 1, a data stream graph 100 is used to represent the processing logic of the stream application. Each directed edge in the data stream graph 100 represents a data stream, each node represents an operator, and each operator in the diagram has at least one input data stream and at least one output data stream. An operator is a smallest unit that is in the stream computing system and that may be scheduled to execute a computing task, and the operator may also be referred to as an execution operator.

When the stream application is deployed in the stream computing system, a user needs to first construct a data stream graph for the stream application, and then the stream application is compiled and runs in the stream system in a data stream graph form to execute a task for processing a data stream. The stream computing system provides an integrated development environment (IDE) for the user. The IDE provides a graphical user interface that is used for constructing a data stream graph, and the graphical user interface includes several basic operators. The user constructs a data stream graph on the graphical user interface by dragging a basic operator, and needs to configure various running parameters for the data stream graph.

Although a manner in which the data stream graph is constructed by dragging the basic operator is extremely intuitive, a function of each basic operator provided in the IDE is pre-divided at an extremely fine granularity to help the user construct a data stream graph. Consequently, complexity of constructing a data stream graph is relatively high, a data stream graph that is actually constructed by the user is relatively complex, and overall computing performance of the data stream graph is relatively poor.

SUMMARY

To improve overall computing performance of a data stream graph, embodiments of the present application provide a stream computing method, apparatus, and system. The technical solutions are as follows.

The stream computing system is generally a distributed computing architecture. The distributed computing architecture includes a manager node and at least one worker node. A user configures a data stream graph in the manager node using a client, and the manager node schedules each operator in the data stream graph to the worker node for running.

According to a first aspect, an embodiment of the present application provides a stream computing method, and the method is applied to a stream computing system including a manager node and a worker node, and includes obtaining, by the manager node, input channel description information, a structured query language (SQL) statement, and output channel description information from a client, generating, by the manager node, a data stream graph according to the input channel description information, the SQL statement, and the output channel description information, where the data stream graph is used to define computational logic of multiple operators for executing a stream computing task and a data stream input/output relationship between the operators, and controlling, by the manager node according to the data stream graph, an operator in the worker node to execute the stream computing task, and scheduling the multiple operators to one or more worker nodes in the stream computing system for execution.

The input channel description information is used to define an input channel, and the input channel is a logical channel that is used to input a data stream from a data production system to the data stream graph. The output channel description information is used to define an output channel, and the output channel is a logical channel that is used to output an output data stream of the data stream graph to a data consumption system.

In this embodiment of the present application, the manager node generates the executable data stream graph according to the input channel description information, the SQL statement, and the output channel description information, and then the manager node controls, according to the data stream graph, the worker node to perform stream computing. This resolves, to some extent, a problem that complexity of constructing a data stream graph is relatively high and overall computing performance of the generated data stream graph is relatively poor because a function of each basic operator is divided at an extremely fine granularity when the data stream graph is constructed in a current stream computing system using the basic operator provided by an IDE. An SQL is a relatively common database management language, and the stream computing system supports the SQL statement in constructing a data stream graph such that system usability can be improved, and user experience can be improved. In addition, the user uses the SQL statement using a programming language characteristic of the SQL language to define processing logic of the data stream graph, and the manager node dynamically generates the data stream graph according to the processing logic defined using the SQL statement such that overall computing performance of the data stream graph is improved.

With reference to the first aspect, in a first possible implementation of the first aspect, the SQL statement includes several SQL rules, and each SQL rule includes at least one SQL substatement, and generating, by the manager node, a data stream graph according to the input channel description information, the SQL statement, and the output channel description information includes generating, by the manager node, a first data stream graph according to the input channel description information, the several SQL rules, and the output channel description information, where the first data stream graph includes several logical nodes, and classifying, by the manager node, the logical nodes in the first data stream graph to obtain several logical node groups, and selecting a common operator from a preset operator library according to each logical node group, and generating a second data stream graph according to the selected common operator, where each operator in the second data stream graph is used to implement functions of one or more logical nodes in a logical node group corresponding to the operator.

In conclusion, according to the stream computing method provided in this implementation, the user only needs to logically write the SQL rule. The manager node generates the first data stream graph according to the SQL rule, where the first data stream graph includes the several logical nodes. Then, the manager node classifies the logical nodes in the first data stream graph using the preset operator library, and converts each logical node group into an operator in the second data stream graph, where each operator in the second data stream graph is used to implement logical nodes that belong to a same logical node group in the first data stream graph. In this way, the user neither needs to have a stream programming thought nor needs to care about classification logic of an operator, and a data stream graph can be constructed provided that the SQL rule is logically written. The manager node generates an operator in the data stream graph such that code editing work of constructing a stream computing application by the user is reduced, and complexity of constructing the stream computing application by the user is reduced.

With reference to the first possible implementation of the first aspect, in a second possible implementation of the first aspect, the first data stream graph includes a source logical node, an intermediate logical node, and a sink logical node that are connected by directed edges, and the generating, by the manager node, a first data stream graph according to the input channel description information, the several SQL rules, and the output channel description information includes generating, by the manager node, the source logical node in the first data stream graph according to the input channel description information, where the source logical node is used to receive an input data stream from the data production system, generating, by the manager node, the intermediate logical node in the first data stream graph according to a select substatement in each SQL rule, where the intermediate logical node is used to indicate computational logic for computing the input data stream, and each intermediate logical node corresponds to one SQL rule, generating, by the manager node, the sink logical node in the first data stream graph according to the output channel description information, where the sink logical node is used to send an output data stream to the data consumption system, and generating, by the manager node, the directed edges between the source logical node, the intermediate logical node, and the sink logical node according to an input substatement and/or an output substatement in each SQL rule.

In conclusion, according to the stream computing method provided in this implementation, the input substatement, the select substatement, and the output substatement in the SQL statement are converted in the stream computing system, and the stream computing system supports the user in logically defining a logical node in the data stream graph using an SQL rule such that difficulty of defining the stream computing application is reduced using an SQL syntax familiar to the user, and a data stream graph customized manner with extremely high usability is provided.

With reference to the first or the second possible implementation of the first aspect, in a third possible implementation of the first aspect, the second data stream graph includes a source operator, an intermediate operator, and a sink operator that are connected by directed edges, and the preset operator library includes a common source operator, a common intermediate operator, and a common sink operator, and classifying, by the manager node, the logical nodes in the first data stream graph, selecting a common operator from a preset operator library according to each logical node group, and generating a second data stream graph according to the selected common operator includes compiling, by the manager node, the common source operator to obtain the source operator in the second data stream graph, selecting, by the manager node from the preset operator library, at least one common intermediate operator for each logical node group that includes the intermediate logical node, and compiling the selected common intermediate operator to obtain the intermediate operator in the second data stream graph, compiling, by the manager node, the common sink operator to obtain the sink operator in the second data stream graph, and generating, by the manager node, the directed edges between operators in the second data stream graph according to the directed edges between the source logical node, the intermediate logical node, and the sink logical node.

In conclusion, according to the stream computing method provided in this implementation, the manager node classifies the multiple logical nodes in the first data stream graph, and implements, using a same common intermediate operator, logical nodes that are classified into a same logical node group. The user does not need to consider factors such as load balance and concurrent execution, and the manager node determines generation of the second data stream graph according to the factors such as load balance and concurrent execution such that difficulty of generating the second data stream graph by the user is further reduced, provided that the user is capable of constructing the logic-level first data stream graph using the SQL.

With reference to any one of the first to the third possible implementations of the first aspect, in a fourth possible implementation, the controlling, by the manager node according to the data stream graph, the worker node to perform stream computing includes scheduling, by the manager node, each operator in the second data stream graph to at least one worker node in the stream computing system, where the worker node is configured to execute the operator, generating, by the manager node according to an output data stream of each operator, subscription publication information corresponding to the operator, and configuring the subscription publication information for the operator, and generating, by the manager node according to an input data stream of each operator, input stream definition information corresponding to the operator, and configuring the input stream definition information for the operator, where the subscription publication information is used to indicate a manner of sending an output data stream corresponding to a current operator, and the input stream definition information is used to indicate a manner of receiving an input data stream corresponding to the current operator.

In conclusion, according to the stream computing method provided in this implementation, a subscription mechanism is set, and a citation relationship between the input data stream and the output data stream of each operator in the second data stream graph is decoupled such that each operator in the second data stream graph can still be dynamically adjusted after the second data stream graph is executed, and overall usability and maintainability of the stream computing application are improved.

With reference to any one of the first to the fourth possible implementations of the first aspect, in a fifth possible implementation, the method further includes receiving, by the manager node, first modification information from the client, where the first modification information is information for modifying the SQL rule, and adding, modifying, or deleting, by the manager node, the corresponding intermediate operator in the second data stream graph according to the first modification information.

In conclusion, according to the stream computing method provided in this implementation, the client sends the first modification information to the manager node, and the manager node adds, modifies, or deletes the intermediate operator in the second data stream graph according to the first modification information such that the manager node can still dynamically adjust the intermediate operator in the second data stream graph after the second data stream graph is generated.

With reference to any one of the first to the fifth possible implementations of the first aspect, in a sixth possible implementation, the method further includes receiving, by the manager node, second modification information from the client, where the second modification information is information for modifying the input channel description information, and adding, modifying, or deleting the source operator in the second data stream graph according to the second modification information, and/or receiving, by the manager node, third modification information from the client, where the third modification information is information for modifying the output channel description information, and adding, modifying, or deleting the sink operator in the second data stream graph according to the third modification information.

In conclusion, according to the stream computing method provided in this implementation, the client sends the second modification information and/or the third modification information to the manager node, and the manager node adds, modifies, or deletes the source operator and/or the sink operator in the second data stream graph such that the manager node can still dynamically adjust the source operator and/or the sink operator in the second data stream graph after the second data stream graph is generated.

According to a second aspect, a stream computing apparatus is provided, where the stream computing apparatus includes at least one unit, and the at least one unit is configured to implement the stream computing method in any one of the first aspect or the possible implementations of the first aspect.

According to a third aspect, a manager node is provided, where the manager node includes a processor and a memory, the processor is configured to store one or more instructions, the instruction is instructed to be executed by the processor, and the processor is configured to implement the stream computing method in any one of the first aspect or the possible implementations of the first aspect.

According to a fourth aspect, an embodiment of the present application provides a computer readable storage medium, and the computer readable storage medium stores an executable program for implementing the stream computing method in any one of the first aspect or the possible implementations of the first aspect.

According to a fifth aspect, a stream computing system is provided, where the stream computing system includes a manager node and at least one worker node, and the manager node is the manager node in the third aspect.

DESCRIPTION OF EMBODIMENTS

Figure 1:
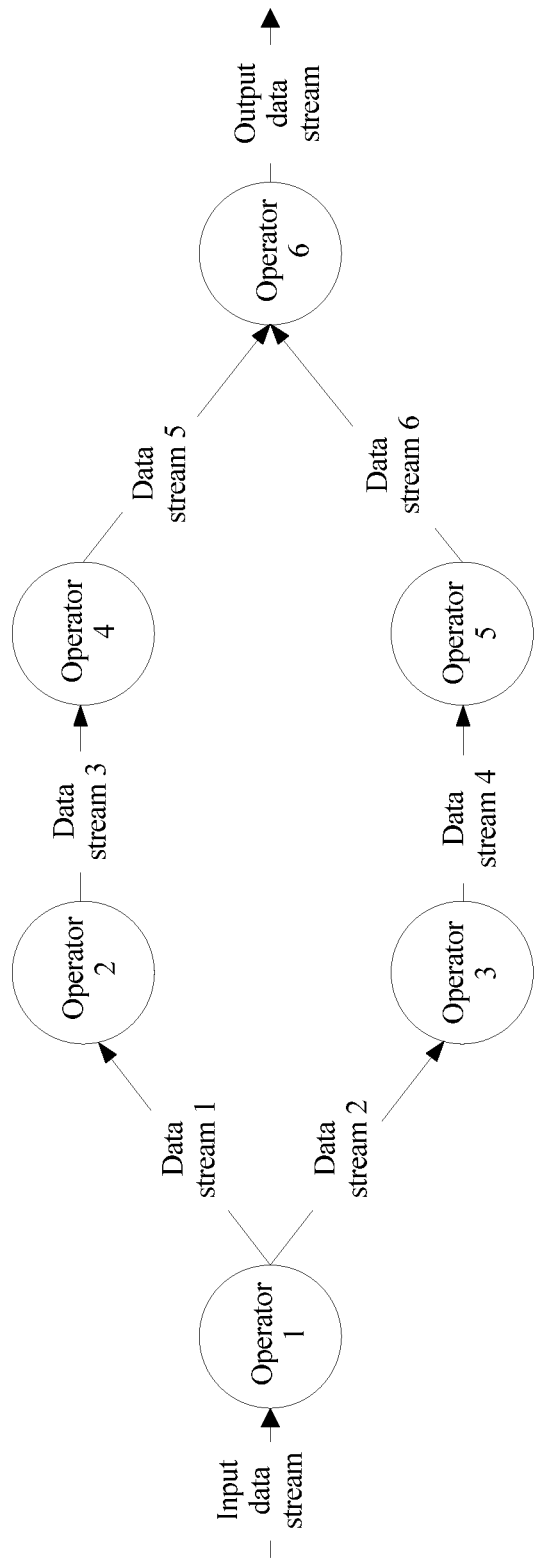
FIG. 1 is a schematic structural diagram of a data stream graph.
Figure 2A:
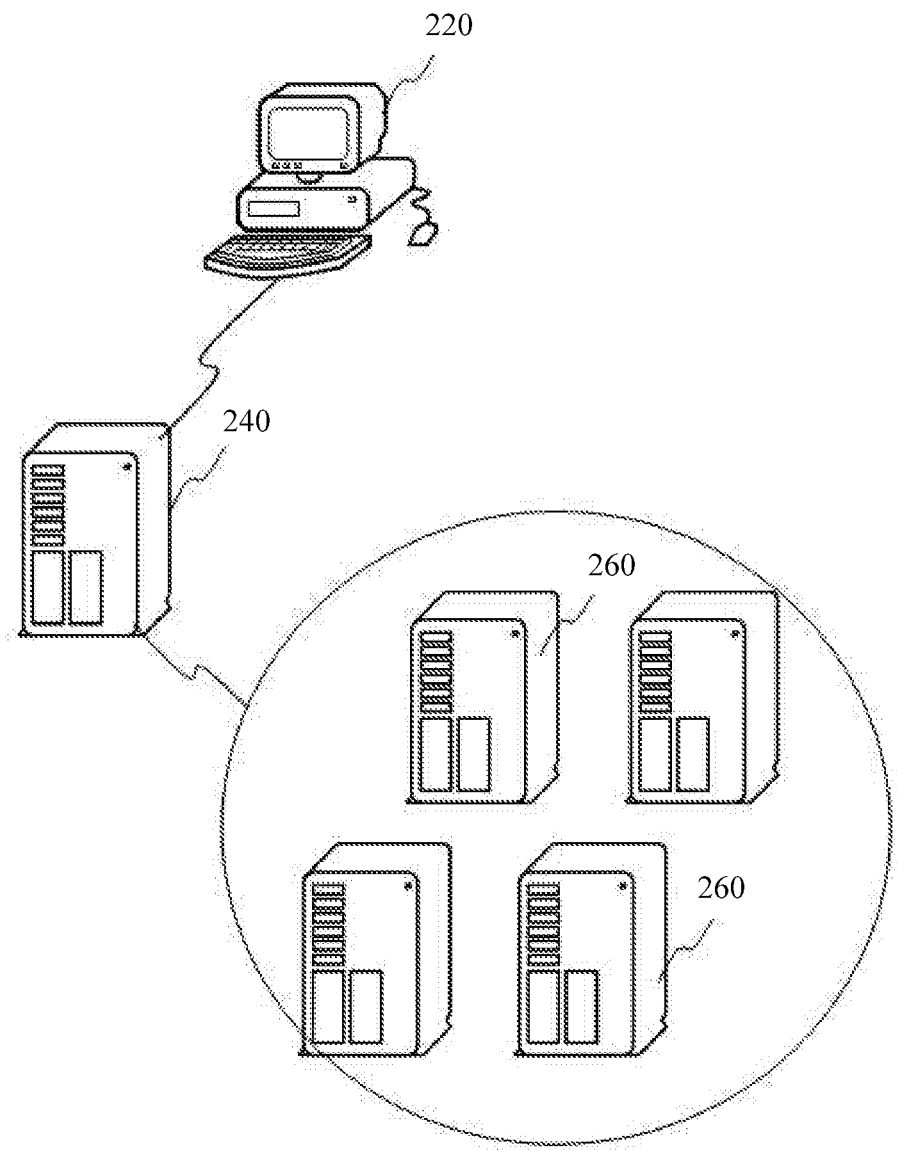
FIG. 2A is a schematic structural diagram of a stream computing system according to an embodiment of the present application.

To make the objectives, technical solutions, and advantages of the present application clearer, the following further describes implementations of the present application in detail with reference to the accompanying drawings. FIG. 2A shows a schematic structural diagram of a stream computing system according to an embodiment of the present application. For example, the stream computing system is a distributed computing system, and the distributed computing system includes a terminal 220, a manager node 240, and multiple worker nodes 260.

The terminal 220 is an electronic device such as a mobile phone, a tablet computer, a laptop portable computer, or a desktop computer, and a hardware form of the terminal 220 is not limited in this embodiment. A client runs in the terminal 220, and the client is configured to provide a human-computer interaction entry between a user and the distributed computing system. The client is capable of obtaining input channel description information, several SQL rules, and output channel description information according to user input.

Optionally, the client is an original client provided by the distributed computing system, or the client is a client independently developed by the user.

The terminal 220 is connected to the manager node 240 using a wired network, a wireless network, or a special-purpose hardware interface.

The manager node 240 is a server or a combination of some servers, and a hardware form of the manager node 240 is not limited in this embodiment. The manager node 240 is a node for managing each worker node 260 in the distributed computing system. Optionally, the manager node 240 is configured to perform at least one of resource management, active/standby management, application management, or task management on each worker node 260. The resource management is management on a computing resource of each worker node 260. The active/standby management is active/standby switching management implemented when a fault occurs on each worker node 260. The application management is management on at least one stream computing application running in the distributed computing system. The task management is management on a computing task of each operator in a stream computing application. In different stream computing systems, the manager node 240 may have different names, for example, a master node.

The manager node 240 is connected to the worker node 260 using a wired network, a wireless network, or a special-purpose hardware interface.

The worker node 260 is a server or a combination of some servers, and a hardware form of the worker node 260 is not limited in this embodiment. Optionally, an operator in a stream computing application runs on the worker node 260. Each worker node 260 is responsible for a computing task of one or more operators. For example, each process in the worker node 260 is responsible for a computing task of one operator.

When there are multiple worker nodes 260, the multiple worker nodes 260 are connected using a wired network, a wireless network, or a special-purpose hardware interface.

Figure 2B:
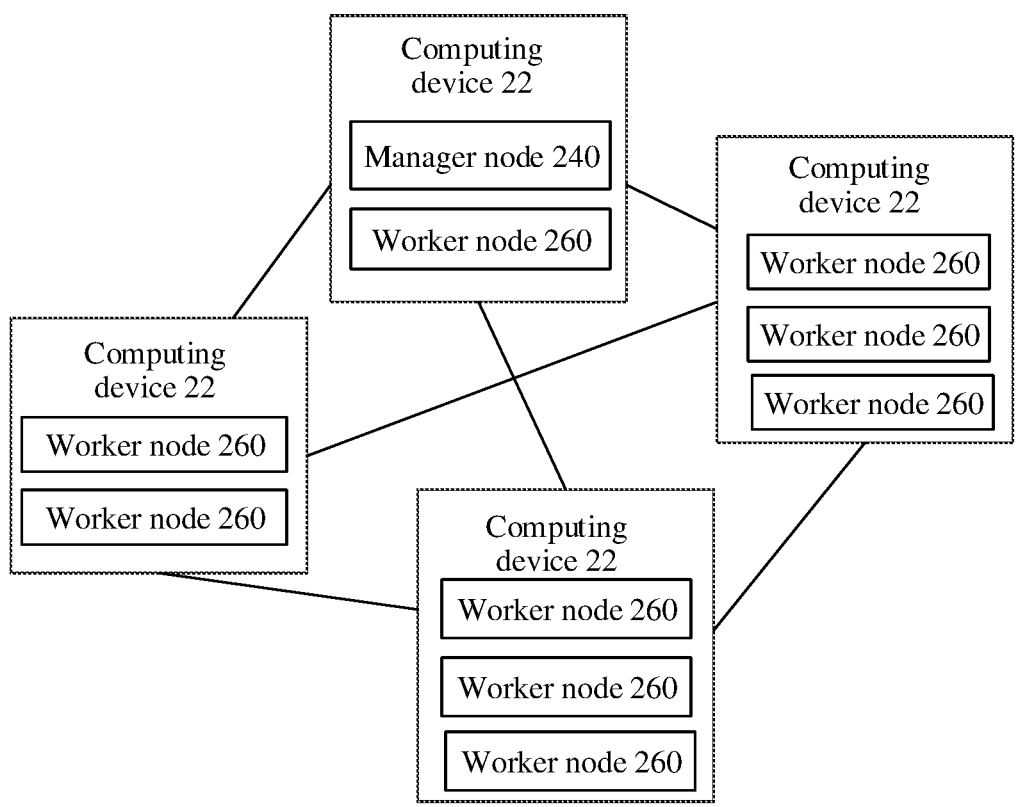
FIG. 2B is a structural block diagram of a stream computing system according to another embodiment of the present application.

It can be understood that, in a virtualization scenario, the manager node 240 and the worker node 260 in the stream computing system may be implemented using a virtual machine running on commodity hardware. FIG. 2B shows a structural block diagram of a stream computing system according to another embodiment of the present application. For example, the stream computing system includes a distributed computing platform including several computing devices 22. At least one virtual machine runs in each computing device 22, and each virtual machine is a manager node 240 or a worker node 260.

The manager node 240 and the worker node 260 are different virtual machines (as shown in FIG. 2B) located in a same computing device 22. Optionally, the manager node 240 and the worker node 260 are different virtual machines located in different computing devices 22.

Optionally, more than one worker node 260 runs in each computing device 22, and each worker node 260 is a virtual machine. A quantity of worker nodes 260 that can run in each computing device 22 depends on compute power of the computing device 22.

Optionally, the computing devices 22 are connected using a wired network, a wireless network, or a special-purpose hardware interface. Optionally, the special-purpose hardware interface is an optical fiber, a cable of a predetermined interface type, or the like.

That is, in this embodiment of the present application, whether the manager node 240 is a physical entity or a logical entity is not limited, and whether the worker node 260 is a physical entity or a logical entity is not limited either. A structure and a function of the manager node 240 are further described below.

Figure 3A:
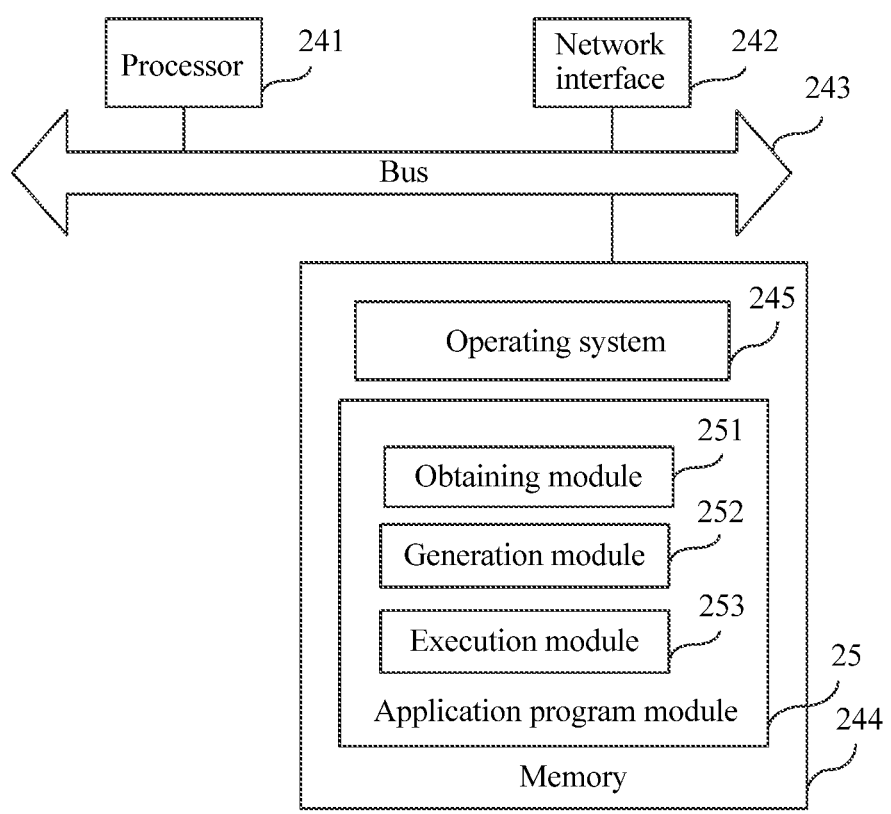
FIG. 3A is a structural block diagram of a manager node according to an embodiment of the present application.

FIG. 3A shows a structural diagram of a manager node 240 according to an embodiment of the present application. The manager node 240 includes a processor 241, a network interface 242, a bus 243, and a memory 244.

The processor 241 is separately connected to the network interface 242 and the memory 244 using the bus 243.

The network interface 242 is configured to implement communication between a terminal 220 and a worker node 260.

The processor 241 includes one or more processing cores. The processor 241 implements a management function in a stream computing system by running an operating system or an application program module.

Optionally, the memory 244 may store an operating system 245 and an application program module 25 required by at least one function. The application program module 25 includes an obtaining module 251, a generation module 252, an execution module 253, and the like.

The obtaining module 251 is configured to obtain input channel description information, an SQL statement, and output channel description information from a client.

The generation module 252 is configured to generate a data stream graph according to the input channel description information, the SQL statement, and the output channel description information, where the data stream graph is used to define computational logic of operators for executing a stream computing task and a data stream input/output relationship between the operators.

The execution module 253 controls, according to the data stream graph, the worker node to execute the stream computing task.

In addition, the memory 244 may be implemented by a volatile or non-volatile storage device of any type or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art can understand that, the structure shown in FIG. 3A does not constitute a limitation on the manager node 240, and the manager node may include more or fewer components than those shown in the diagram, or may combine some components or have different component arrangements.

Figure 3B:
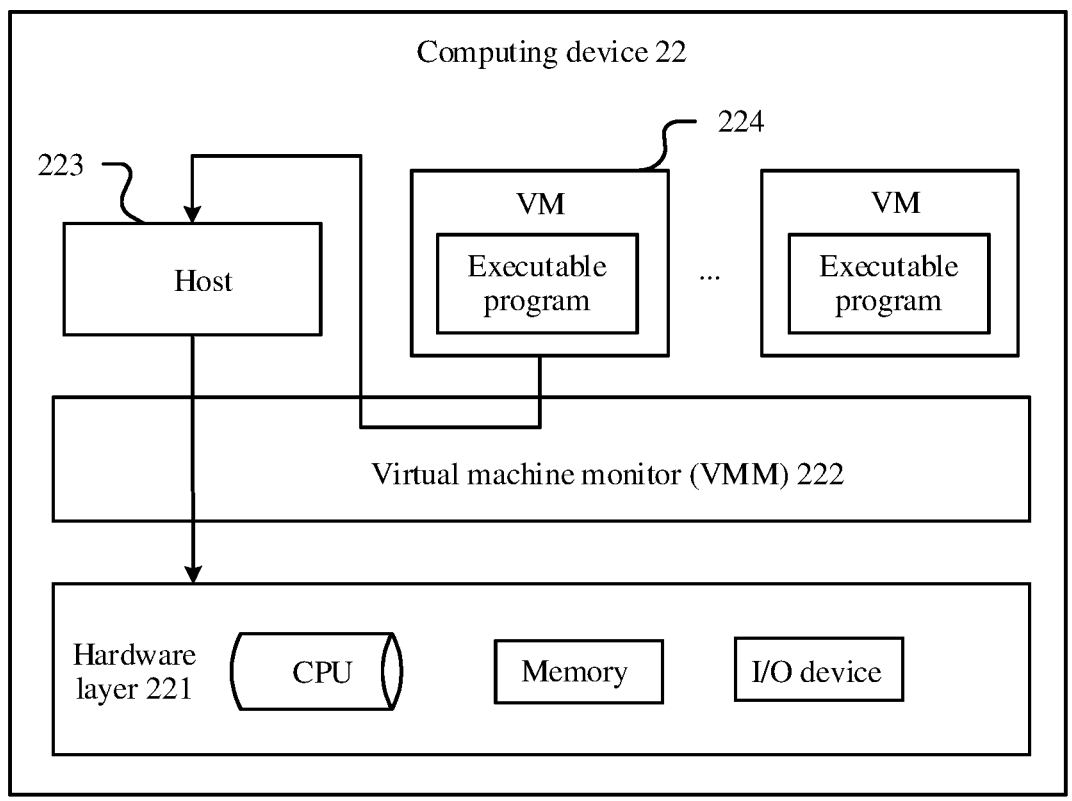
FIG. 3B is a structural block diagram of a manager node according to another embodiment of the present application.

FIG. 3B shows an embodiment of a manager node 240 in a virtualization scenario. As shown in FIG. 3B, the manager node 240 is a virtual machine (designated as VM) 224 running in a computing device 22. The computing device 22 includes a hardware layer 221, a virtual machine monitor (VMM) 222 running at the hardware layer 221, and a host machine (designated as Host) 223 and several virtual machines running on the VMM 222. The hardware layer 221 includes but is not limited to an input/output (I/O) device, a central processing unit (CPU), and a memory. An executable program runs on the VM, and the VM invokes a hardware resource of the hardware layer 221 by running the executable program and using the Host 223 in a program running process to implement functions of the obtaining module 251, the generation module 252, and the execution module 253. Further, the obtaining module 251, the generation module 252, and the execution module 253 may be included in the executable program in a form of a software module or a function, and the VM 224 runs the executable program by invoking resources such as the CPU and the memory at the hardware layer 221 to implement the functions of the obtaining module 251, the generation module 252, and the execution module 253.

Figure 4:
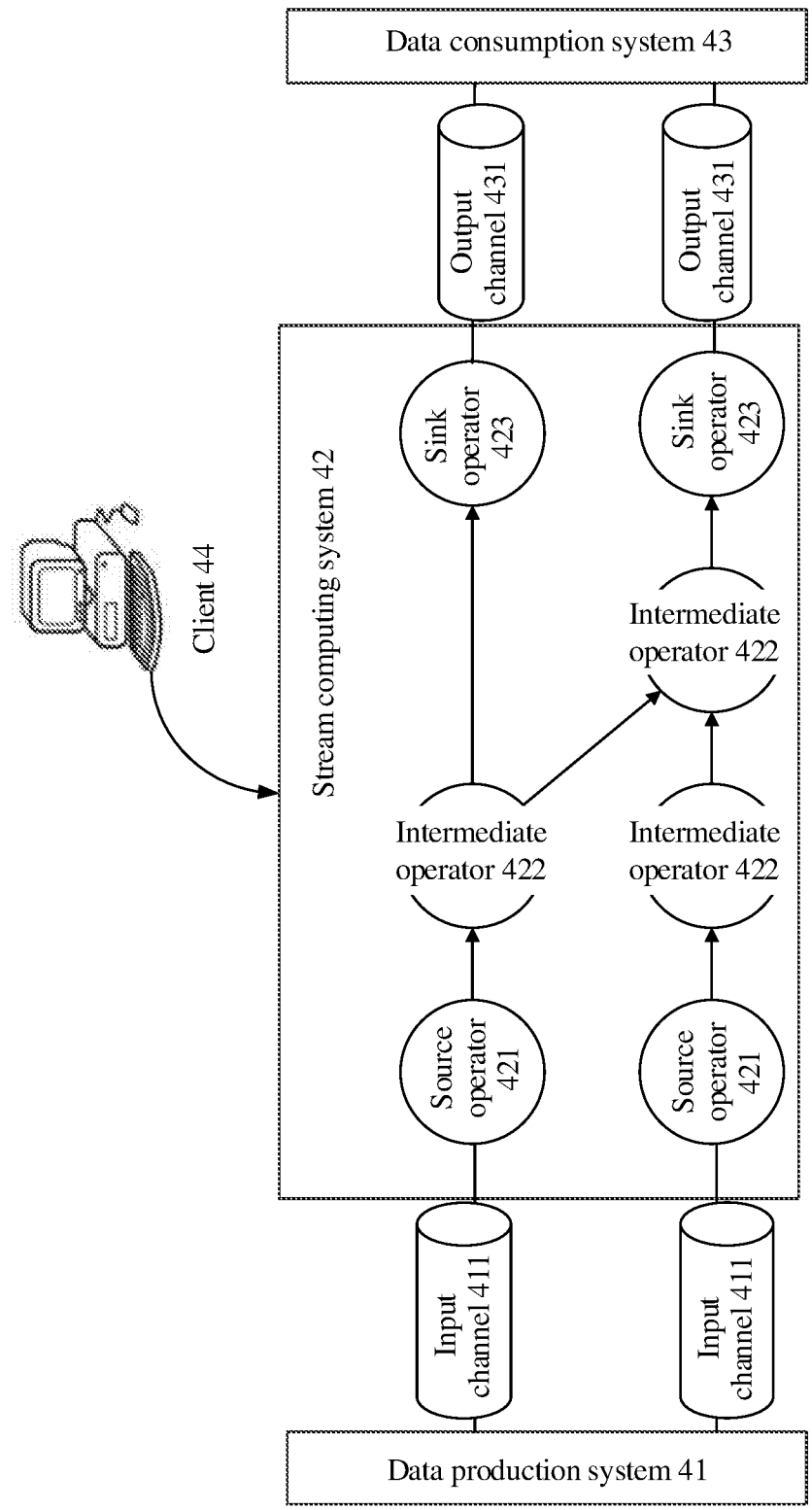
FIG. 4 is a schematic principle diagram of a stream computing process according to an embodiment of the present application.

With reference to FIG. 2A-2B, and FIG. 3A-3B, an overall process of stream computing performed in a stream computing system is described below. FIG. 4 shows a schematic principle diagram of a stream computing process according to an embodiment of the present application. A data production system 41, a stream computing system 42, and a data consumption system 43 are included in the overall stream computing process.

The data production system 41 is used to generate data. In different implementation environments, the data production system 41 may be a finance system, a network monitoring system, a manufacturing system, a web application system, a sensing and detection system, or the like.

Optionally, a storage form of the data generated by the data production system 41 includes but is not limited to at least one of a file, a network data packet, or a database. The storage form of the data is not limited in this embodiment of the present application.

Optionally, in terms of hardware, the data production system 41 is connected to the stream computing system 42 using a hardware line such as a network, an optical fiber, or a hardware interface card. In terms of software, the data production system 41 is connected to the stream computing system 42 using an input channel 411. The input channel 411 is a logical channel that is used to input a data stream from the data production system 41 to a data stream graph in the stream computing system 42, and the logical channel is used to implement an interconnection between the data production system 41 and the stream computing system 42 in a transmission path, a transmission protocol, a data format, a data encoding/decoding scheme, and the like.

The stream computing system 42 generally includes a data stream graph including multiple operators. The data stream graph may be regarded as a stream computing application. The data stream graph includes a source operator 421, at least one intermediate operator 422, and a sink operator 423. The source operator 421 is used to receive an input data stream from the data production system 41, and the source operator 421 is further used to send the input data stream to the intermediate operator 422. The intermediate operator 422 is used to compute the input data stream, and an output data stream obtained by means of computing to a next-level intermediate operator 422 or the sink operator 423. The sink operator 423 is used to send the output data stream to the data consumption system 43. The operators are scheduled by the manager node in FIG. 2, and run on the multiple worker nodes 260 in FIG. 2 in a distributed form. At least one operator runs on each worker node 260.

Optionally, in terms of hardware, the stream computing system 42 is connected to the data consumption system 43 using a hardware line such as a network, an optical fiber, or a hardware interface card. In terms of software, the stream computing system 42 is connected to the data consumption system 43 using an output channel 431. The output channel 431 is a logical channel that is used to output an output data stream of the stream computing system 42 to the data consumption system 43, and the logical channel is used to implement an interconnection between the stream computing system 42 and the data consumption system 43 in a transmission path, a transmission protocol, a data format, a data encoding/decoding scheme, and the like.

The data consumption system 43 is used to use the output data stream computed by the stream computing system 42.

The data consumption system 43 persistently stores or reuses the output data stream. For example, the data consumption system 43 is a recommendation system, and the recommendation system recommends an interested web page, a text, audio, a video, shopping information, and the like to a user according to the output data stream.

The data stream graph in the stream computing system 42 is generated, deployed, or adjusted by the user using a client 44.

Figure 5:
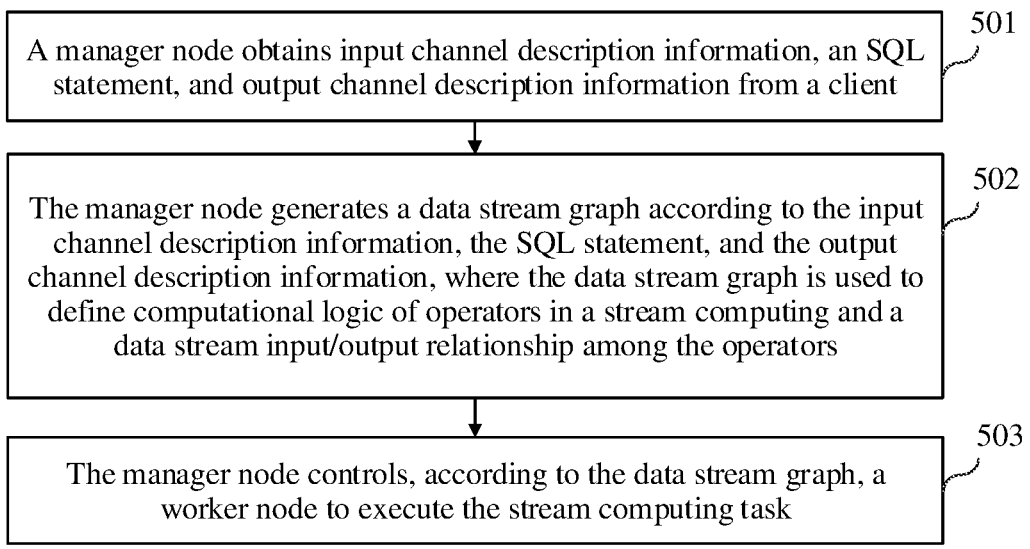
FIG. 5 is a method flowchart of a stream computing method according to an embodiment of the present application.

In an embodiment of the present application, a stream computing system provides a data stream graph construction manner in which a data stream graph is constructed using an SQL statement. For example, FIG. 5 shows a flowchart of a stream computing method according to an embodiment of the present application. An example in which the stream computing method is applied to the manager node shown in FIG. 2A-2B and FIG. 3A-3B is described in this embodiment. The method includes the following steps.

Step 501: A manager node obtains input channel description information, an SQL statement, and output channel description information from a client.

A user sends the input channel description information, the SQL statement, and the output channel description information to the manager node using the client.

The input channel description information is used to define an input channel, or the input channel description information is used to describe an input manner of an input data stream, or the input channel description information is used to describe construction information of an input channel. The input channel is a logical channel that is used to input a data stream from a data production system to a data stream graph.

Optionally, the input channel description information includes at least one of transmission medium information, transmission path information, data format information, or data decoding scheme information. For example, one piece of input channel description information includes an Ethernet medium, an Internet Protocol (IP) address, a port number, a transmission control protocol (TCP) data packet, and a default decoding scheme. Another piece of input channel description information includes a file storage path and an Excel file.

The SQL statement is used to define computational logic of each operator in the data stream graph, and an input data stream and an output data stream of each operator. Optionally, each operator has at least one input data stream, and each operator has at least one output data stream.

The output channel description information is used to define an output channel, or the output channel description information is used to describe an output manner of an output data stream, or the output channel description information is used to describe construction information of an output channel. The output channel is a logical channel that is used to output an output data stream of the data stream graph to a data consumption system.

Optionally, the output channel description information includes at least one of transmission medium information, transmission path information, data format information, or data encoding scheme information. For example, one piece of output channel description information includes a file storage path and a comma-separated values (CSV) file.

The manager node receives the input channel description information, the SQL statement, and the output channel description information that are sent by the client.

Step 502: The manager node generates a data stream graph according to the input channel description information, the SQL statement, and the output channel description information, where the data stream graph is used to define computational logic of operators in stream computing and a data stream input/output relationship among the operators.

Optionally, the SQL statement includes several SQL rules, and each SQL rule is used to define computational logic of one logical operator, and an input data stream and an output data stream of the operator. Each SQL rule includes at least one SQL substatement.

Optionally, each operator has at least one input data stream, and each operator has at least one output data stream.

Optionally, an executable data stream graph includes a source operator (Source), an intermediate operator, and a sink operator (Sink). The source operator is used to receive an input data stream from the data production system, and input the input data stream to the intermediate operator. The intermediate operator is used to compute the input data stream from the source operator, or the intermediate operator is used to compute an input data stream from another intermediate operator. The sink operator is used to send an output data stream to the data consumption system according to a computing result from the intermediate operator.

Step 503: The manager node controls, according to the data stream graph, a worker node to execute a stream computing task.

The manager node controls, according to the data stream graph, each worker node in the stream computing system to execute a stream computing task. The "data stream graph" herein should be understood as an executable stream application.

Optionally, the manager node schedules the generated data stream graph to each worker node for distributed execution. Multiple worker nodes perform stream computing on the input data stream from the data production system according to the data stream graph to obtain a final output data stream, and output the output data stream to the data consumption system.

In conclusion, according to the stream computing method provided in this implementation, the manager node generates the executable data stream graph according to the input channel description information, the SQL statement, and the output channel description information, and then the manager node controls, according to the data stream graph, the worker node to perform stream computing. This resolves a problem that overall computing performance of a generated data stream graph is relatively poor because a function of each basic operator is divided at an extremely fine granularity when the data stream graph is constructed in a current stream computing system using the basic operator provided by an IDE. An SQL is a relatively common database management language, and the stream computing system supports the SQL statement in constructing a data stream graph such that usability of constructing the data stream graph by the user using the SQL statement is ensured. In addition, the user uses the SQL statement using a programming language characteristic of the SQL language to define processing logic of the data stream graph, and the manager node dynamically generates the data stream graph with a proper quantity of operators according to the processing logic defined using the SQL statement such that overall computing performance of the data stream graph is improved.

Figure 6:
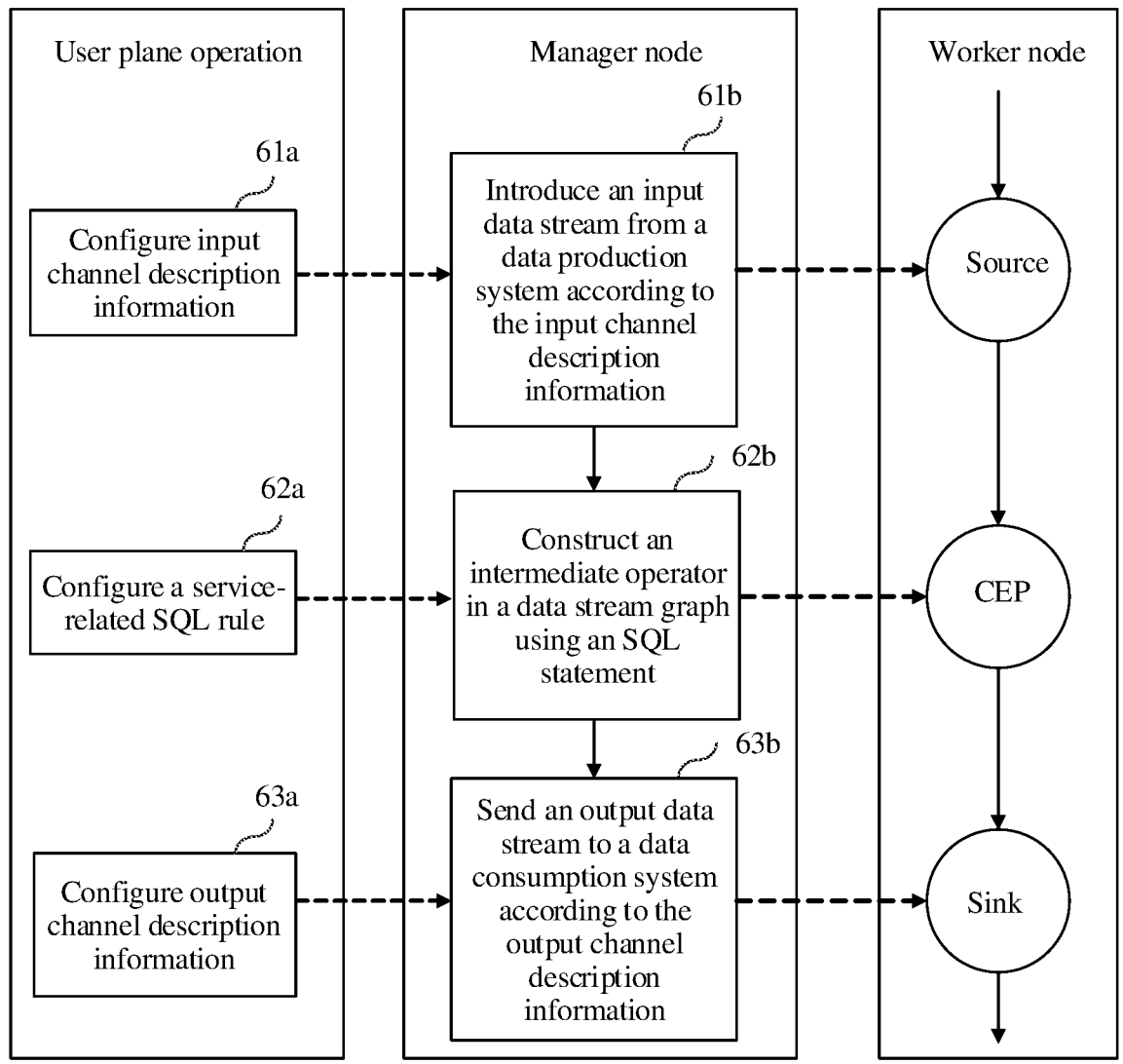
FIG. 6 is a schematic principle diagram of a stream computing method according to an embodiment of the present application.

To more clearly understand a computing principle of the stream computing method provided in the embodiment in FIG. 5, referring to FIG. 6, from a perspective of a user, the user needs to configure input channel description information 61a, configure a service-related SQL rule 62a, and configure output channel description information 63a, from a perspective of a manager node, the manager node introduces an input data stream from a data production system according to input channel description information 61b, constructs an operator in a data stream graph using an SQL statement 62b, and sends an output data stream to a data consumption system according to output channel description information 63b, from a perspective of a worker node, the worker node needs to execute a source operator (designated as Source), an intermediate operator complex event processing (CEP), and a sink operator (designated as Sink) in a stream computing application that are generated by a manager node.

Figure 7:
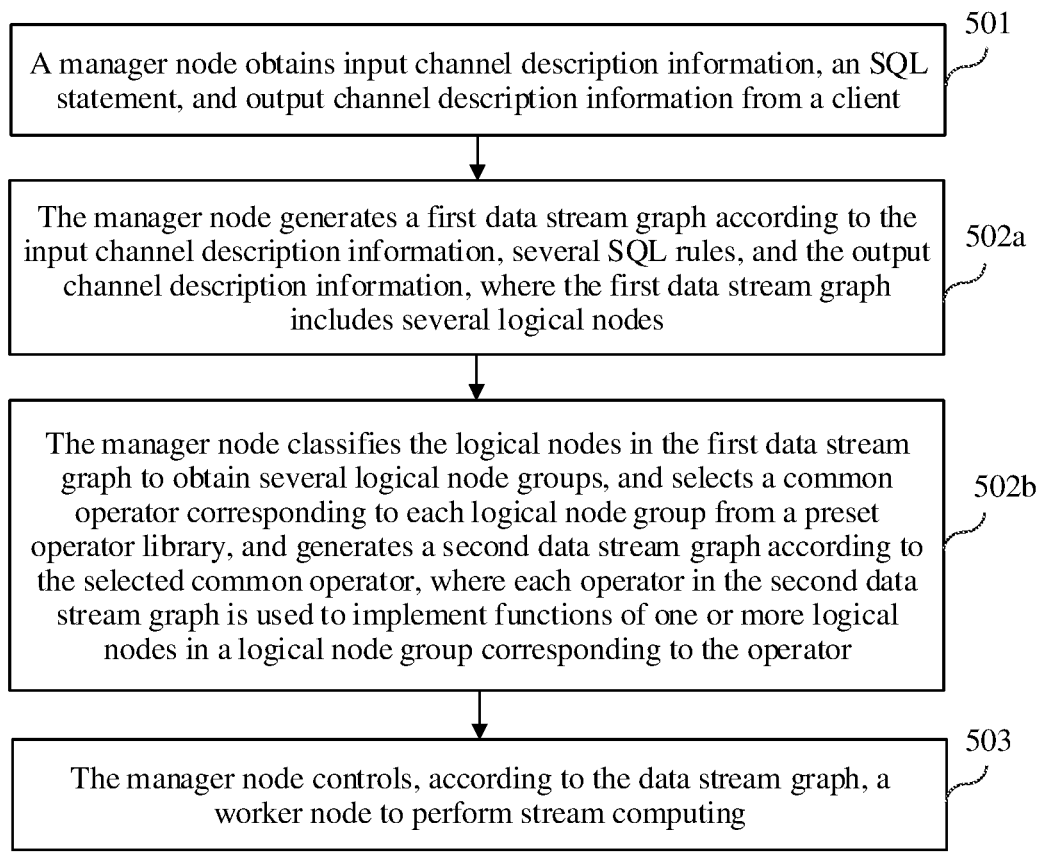
FIG. 7 is a method flowchart of a stream computing method according to another embodiment of the present application.

Step 502 may be implemented by several subdivided steps. In an optional embodiment, as shown in FIG. 7, step 502 may be replaced with step 502a and step 502b for implementation.

Step 502a: The manager node generates a first data stream graph according to the input channel description information, several SQL rules, and the output channel description information, where the first data stream graph includes several logical nodes.

Step 502b: The manager node classifies the logical nodes in the first data stream graph to obtain several logical node groups, and selects a common operator corresponding to each logical node group from a preset operator library, and generates a second data stream graph according to the selected common operator, where each operator in the second data stream graph is used to implement functions of one or more logical nodes in a logical node group corresponding to the operator.

Optionally, the first data stream graph is a temporary logic-level data stream graph, and the second data stream graph is an executable code-level data stream graph. The first data stream graph is a temporary data stream graph obtained after one-tier compiling is performed according to the several SQL rules in the SQL statement, and the second data stream graph is an executable data stream graph obtained after two-tier compiling is performed according to the first data stream graph. An operator in the second data stream graph may be assigned by means of management scheduling to a worker node for execution.

After obtaining the input channel description information, the several SQL rules, and the output channel description information, the manager node first obtains the first data stream graph by means of one-tier compiling. The first data stream graph includes a source logical node, several intermediate logical nodes, and a sink logical node that are connected by directed edges. The first data stream graph includes several logical nodes.

Then, the manager node classifies the logical nodes in the first data stream graph, and performs two-tier compiling on the logical node groups in the first data stream graph using the common operator in the preset operator library to obtain the second data stream graph. Each operator in the second data stream graph is used to implement logical nodes in the first data stream graph that are classified into a same logical node group.

The common operator is a preset universal operator that is used to implement one or more functions.

For example, one operator is used to implement a function of one source logical node, or one operator is used to implement functions of one or more intermediate logical nodes, or one operator is used to implement a function of one sink logical node.

For example, one operator is used to implement functions of one source logical node and one intermediate logical node, one operator is used to implement functions of one source logical node and multiple intermediate logical nodes, one operator is used to implement functions of multiple intermediate logical nodes, one operator is used to implement functions of one intermediate logical node and one sink node, or one operator is used to implement functions of multiple intermediate logical nodes and one sink node.

When the logical nodes in the first data stream graph are being classified, the manager node may classify the logical nodes according to at least one factor of load balance, operator concurrence, intimacy between the logical nodes, and mutual exclusiveness between the logical nodes.

When the manager node performs classification according to the load balance, the manager node classifies the logical nodes with reference to compute power of each operator and a computing resource consumed by each logical node such that a computing amount of each operator is relatively balanced. For example, if compute power of one operator is 100%, a computing resource that needs to be consumed by a logical node A is 30%, a computing resource that needs to be consumed by a logical node B is 40%, a computing resource that needs to be consumed by a logical node C is 50%, and a computing resource that needs to be consumed by a logical node D is 70%, the logical node A and the logical node D are classified into a same logical node group, and the logical node B and the logical node C are classified into a same logical node group.

When the manager node performs classification according to the operator concurrence, the manager node obtains a data stream size of each input data stream, and determines, according to the data stream size of each input data stream, a quantity of logical nodes used to process the input data stream such that computing speeds of all input data streams are the same or similar.

When the manager node performs classification according to the intimacy between the logical nodes, the manager node computes the intimacy between the logical nodes according to a type of an input data stream and/or a dependency relationship between the logical nodes, and then classifies logical nodes with higher intimacy into a same logical node group. For example, if an input data stream 1 is an input data stream of both the logical node A and the logical node D, intimacy between the logical node A and the logical node D is relatively high, and the logical node A and the logical node D are classified into a same logical node group and are implemented by a same operator such that a quantity of data streams transmitted between operators can be reduced. For another example, if an output data stream of the logical node A is an input data stream of the logical node B, and the logical node B depends on the logical node A, intimacy between the logical node A and the logical node B is relatively high, and the logical node A and the logical node B are classified into a same logical node group and are implemented by a same operator such that a quantity of data streams transmitted between operators can also be reduced.

When the manager node performs classification according to the mutual exclusiveness between the logical nodes, the manager node detects whether there is mutual exclusiveness in arithmetic logic between the logical nodes, and classifies two logical nodes into different logical node groups when there is mutual exclusiveness in arithmetic logic between the two logical nodes. Because a distributed computing system is based on concurrence and coordination between multiple operators, mutually exclusive access to a shared resource by the multiple operators is inevitable. To avoid an access conflict, two mutually exclusive logical nodes are classified into different logical node groups.

In conclusion, according to the stream computing method provided in this embodiment, the user only needs to logically write the SQL rule. The manager node generates the first data stream graph according to the SQL rule, where the first data stream graph includes the several logical nodes. Then, the manager node classifies the logical nodes in the first data stream graph using the preset operator library, to obtain the several logical node groups, and converts each logical node group into an operator in the second data stream graph, where each operator in the second data stream graph is used to implement logical nodes that belong to a same logical node group. In this way, the user neither needs to have a stream programming thought nor needs to care about classification logic of an operator, and a flow diagram can be constructed provided that the SQL rule is logically written. The manager node generates an operator in the second data stream graph such that code editing work of constructing a stream computing application by the user is reduced, and complexity of constructing the stream computing application by the user is reduced.

An example of the foregoing stream computing method is described below in detail in an embodiment in FIG. 8A and FIG. 8B.

Figure 8A:
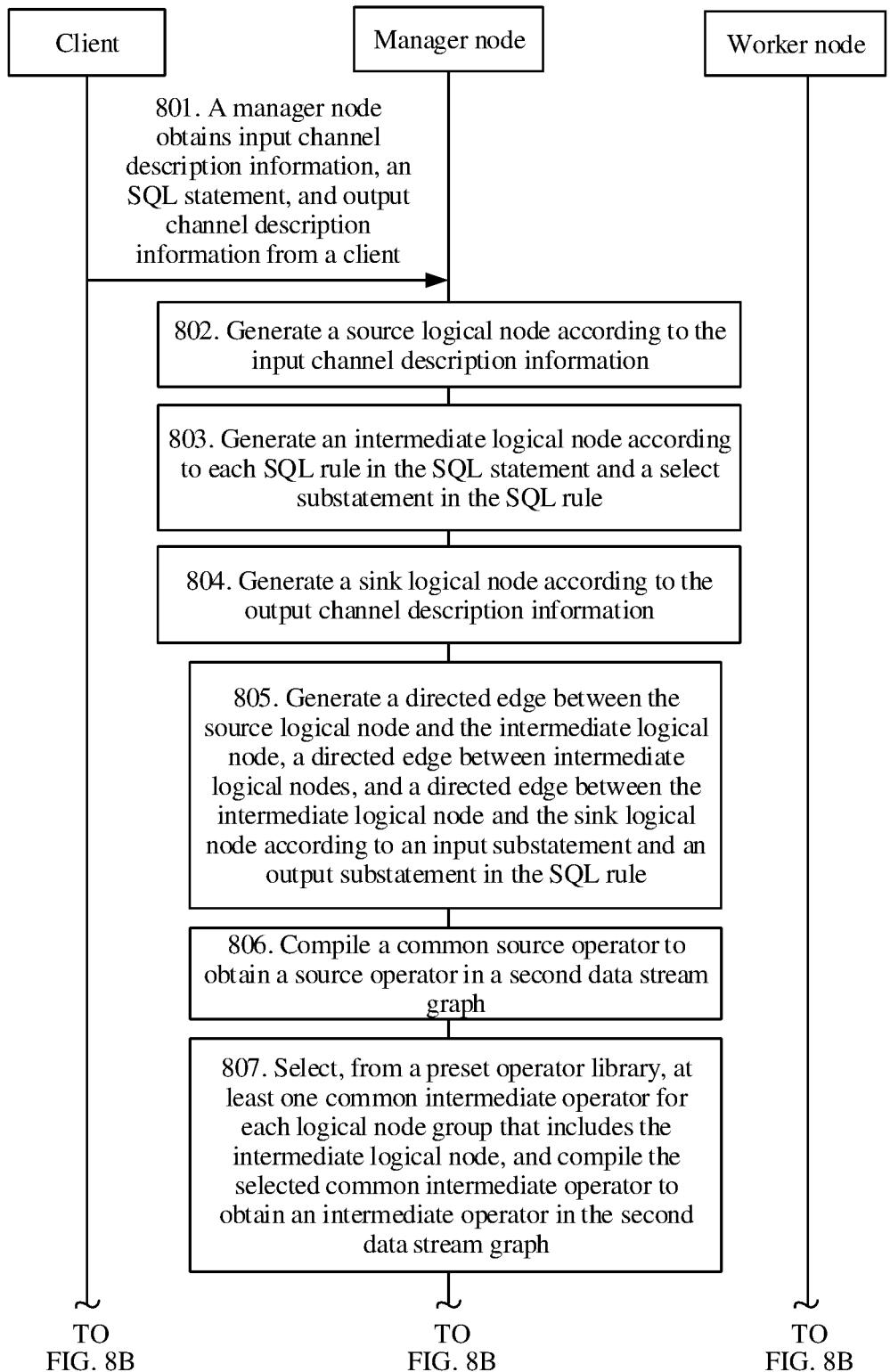
FIG. 8A and FIG. 8B are a method flowchart of a stream computing method according to another embodiment of the present application.
Figure 8B:
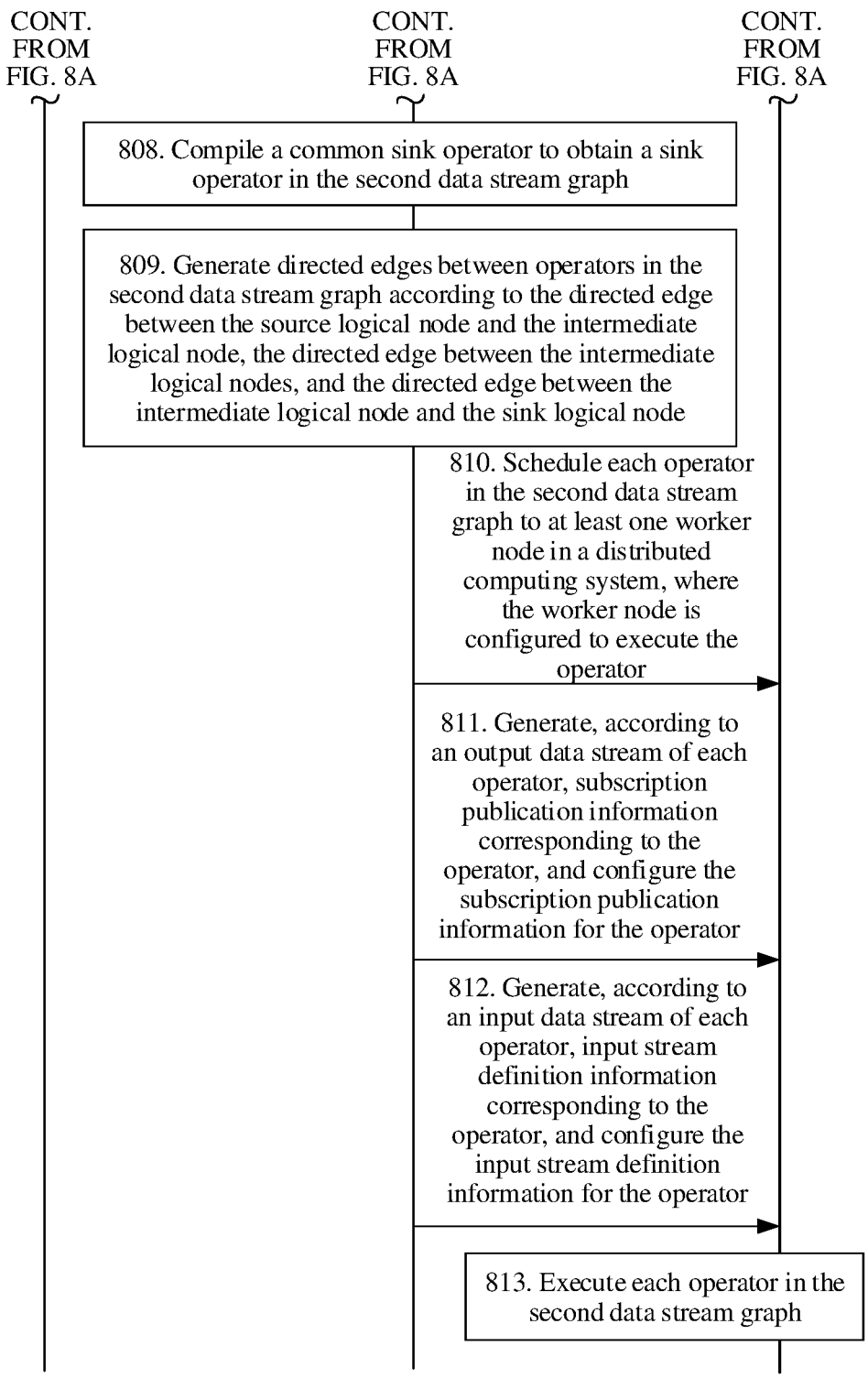

FIG. 8A and FIG. 8B show a flowchart of a stream computing method according to another embodiment of the present application. This embodiment describes an example in which the stream computing method is applied to the stream computing system shown in FIG. 2. The method includes the following steps.

Step 801: A management node obtains input channel description information, an SQL statement, and output channel description information from a client.

1. The input channel description information is used to define an input channel, and the input channel is a logical channel that is used to input a data stream from a data production system to a data stream graph.

An Extensible Markup Language (XML) file is used as an example for the input channel description information, and an example of the input channel description information is as follows:

```
<channel name="tcp_channel_xdr" type="in">   //channel name tcp_channel_xdr, type input
    <transfers type="tcp"> //transfer type: tcp
    <mode>server</mode> // transmission mode: server
```

```
<addr>127.0.0.1:8080;</ip> //transmission address: 127.0.0.1:8080
</transfers>
<!--global data stream format definition, and encoding/decoding format definition-->
<schemadep>
<schema name="XDR"  type="binary" > //schema name "XDR", type: binary file
        <attribute name="MSISON"  type="string"  length="12"/> //attribute
name: MSISON type: string length: 12
        < attribute name="HOST"  type="string"  length="4"/> //attribute name:
HOST type: string length: 4
    < attribute name="Case ID"  type="unit32" />   //attribute name: Case ID type:
32-bit integer
    </schema>
    </schemadep>
    <!--input data stream definition-->
    <in>
    <stream name="cau_xdr"  decode="default" schema="XDR"/> //input data stream
name: cau_xdr  decoding scheme: default, schema name:XDR
    </in>
    </channel>.
```

A specific form of the input channel description information is not limited in this embodiment of the present application, and the foregoing example is merely an example for description.

Optionally, the input data stream from the data production system is a TCP or UDP data stream, a file, a database, a distributed file system (for example, Hadoop Distributed File System, HDFS for short), or the like.

2. An SQL is used to define computational logic of each operator in the data stream graph, and an input data stream and an output data stream of each operator.

The SQL includes a data definition language (DLL) and a data manipulation language (DML). When each operator in the data stream graph is defined using the SQL, the input data stream and/or the output data stream are/is usually defined using the DLL language, for example, a create substatement, and the computational logic is defined using the DML language, for example, an insert into substatement or a select substatement.

To define multiple operators in the data stream graph, the SQL statement generally includes multiple SQL rules, each SQL rule includes at least one SQL substatement, and each SQL rule is used to define a logical node in the data stream graph.

For example, a set of typical SQL rules includes
insert into B . . .
select . . .
from A . . .
where . . . .

In the database field, an insert into substatement is a statement for inserting data into a data table in the SQL, a select substatement is a statement for selecting data from a data table in the SQL, a from substatement is a statement for reading data from a data table in the SQL, and a where substatement is a condition statement added to the select substatement when data needs to be selected from a data table according to a condition. In the foregoing example, the input data stream is A, and the output data stream is B.

In the SQL in this embodiment, the insert into substatement is converted into a statement that is used to define an output data stream, the select substatement is converted into a statement that is used to indicate computational logic, the from substatement is converted into a statement that is used to define an input data stream, and the where substatement is converted into a statement for selecting data.

For example, the several SQL rules entered by the user that are used to configure a data stream graph include the following:

```
Create  stream  s_edr(TriggerType  uint32,MSISDN  string,QuotaName
string,QuotaConsumption uint32, QuotaBalance uint32, CaseID uint32)
    as select * from tcp_channel_edr.edr_event;        //SQL rule 1
    Create  stream  s_xdr(MSISDN  string,Host  string,CaseID  uint32,CI
uint32,App_Category      uint32,App_sub_Category       uint32,Up_Thoughput
uint32,Down_Thoughput uint32)
    as select * from tcp_channel_xdr.xdr_event;        //SQL rule 2
    insert into temp1
    select *form s_edr as a
    where a.QuotaName='GPRS'and a.QuotaConsumption * 10 >=a.QuotaBalance * 8;
//SQL rule 3
    insert into file_channel_result1.cep_result
    select b.*,1 as Fixnum
    from s_xdr as a,temp1.win:time_sliding(15 sec) as b
    where a.MSISON= b.MSISDN;                //SQL rule 4
    insert into file_channel_result2.cep_result
    select MSISDN,App_Category,App_sub)_category;
       sum (Up_Thoughput+Down_Thoughput) as Thoughput
    from s_xdr.win:time_tumbling(5 min)
    group by MSISDN,App_Category,APP_Sub_Category   //SQL rule 5
```

For the SQL rule 1, an input data stream is tcp_channel_edr, and an output data stream is s_edr. For the SQL rule 2, an input data stream is tcp_channel_xdr, and an output data stream is s_xdr. For the SQL rule 3, an input data stream is tcp_channel_edr, and an output data stream is s. For the SQL rule 4, an input data stream is s_xdr and temp1, and an output data stream is file_channel_result1. For the SQL rule 5, an input data stream is s_xdr, and an output data stream is file_channel_result2.

3. The output channel description information is used to define an output channel, and the output channel is a logical channel that is used to send an output data stream to a data consumption system.

An XML file is used as an example for the output channel description information, and an example of the output channel description information is as follows:

```
<channel name="file_channel_result" type="out">   //channel name tcp_channel_xdr,
type: output
    <parameter>   //parameter
        <type>file<type>   //type: file
    <mode>server</mode> // transmission mode: csv file
    <line_terminator>\n< line_terminator >//line terminator:\n
    <file_name>/home/demo/result.csv</file_name> //file name: /home/demo/result.csv
    </ parameter >
    <schema name="RESULT_OUT"  type="text" delimiter "," > //schema name:
RESULT_OUT, type: text, delimiter:,
        <attribute name="TriggerType"  type="uint32"/>   //attribute name:
TriggerType type: uint32
        <attribute name="MSISDN"  type="string"/> //attribute name: MSISDN
type: string
    < attribute name="Case ID"  type="unit32" />   //attribute name: Case ID type:
32-bit integer
    </schema>
    <!--output data stream definition-->
    <out>
    <stream name="outevent"  schema="RESULT_OUT"/>   //output stream name:
outevent, schema name: RESULT_OUT
    </out>
    </channel>.
```

Optionally, the input data stream from the data production system is a TCP or User Datagram Protocol (UDP) data stream, a file, a database, a distributed file system (for example, HADOOP Distributed File System (HDFS)), or the like.

A first data stream graph is a temporary data stream graph including a source logical node, an intermediate logical node, and a sink logical node. The first data stream graph is a logic-level data stream graph. A generation process of the first data stream graph may include step 802 to step 805.

Step 802: The manager node generates a source logical node according to the input channel description information.

Optionally, the source logical node is used to receive an input data stream from the data production system. Generally, each source logical node is used to receive one input data stream from the data production system.

Step 803: The manager node generates an intermediate logical node according to each SQL rule in the SQL statement and a select substatement in the SQL rule.

Optionally, for each SQL rule, the intermediate logical node is generated according to computational logic defined by the select substatement in the SQL rule.

For example, an intermediate logical node that is used to compute the input data stream tcp_channel_edr is generated according to a select statement in the SQL rule 1. For another example, an intermediate logical node that is used to compute the input data stream tcp_channel_xdr is generated according to a select statement in the SQL rule 2.

Step 804: The manager node generates a sink logical node according to the output channel description information.

Optionally, the sink logical node is used to send an output data stream to the data consumption system. Generally, each sink logical node is used to output one output data stream.

Step 805: The manager node generates a directed edge between the source logical node and the intermediate logical node, a directed edge between intermediate logical nodes, and a directed edge between the intermediate logical node and the sink logical node according to an input substatement and an output substatement in the SQL rule.

An input edge of the intermediate logical node corresponding to the SQL rule is generated according to a substatement in the SQL rule. The other end of the input edge is connected to the source logical node, or the other end of the input edge is connected to another intermediate logical node.

An output edge of the intermediate logical node corresponding to the SQL rule is generated according to an insert into substatement in the SQL rule. The other end of the output edge is connected to another intermediate logical node, or the other end of the output edge is connected to the sink logical node.

For an intermediate logical node, an input edge is a directed edge pointing to the intermediate logical node, and an output edge is a directed edge pointing from the intermediate logical node to another intermediate logical node or a sink logical node.

Figure 8C:
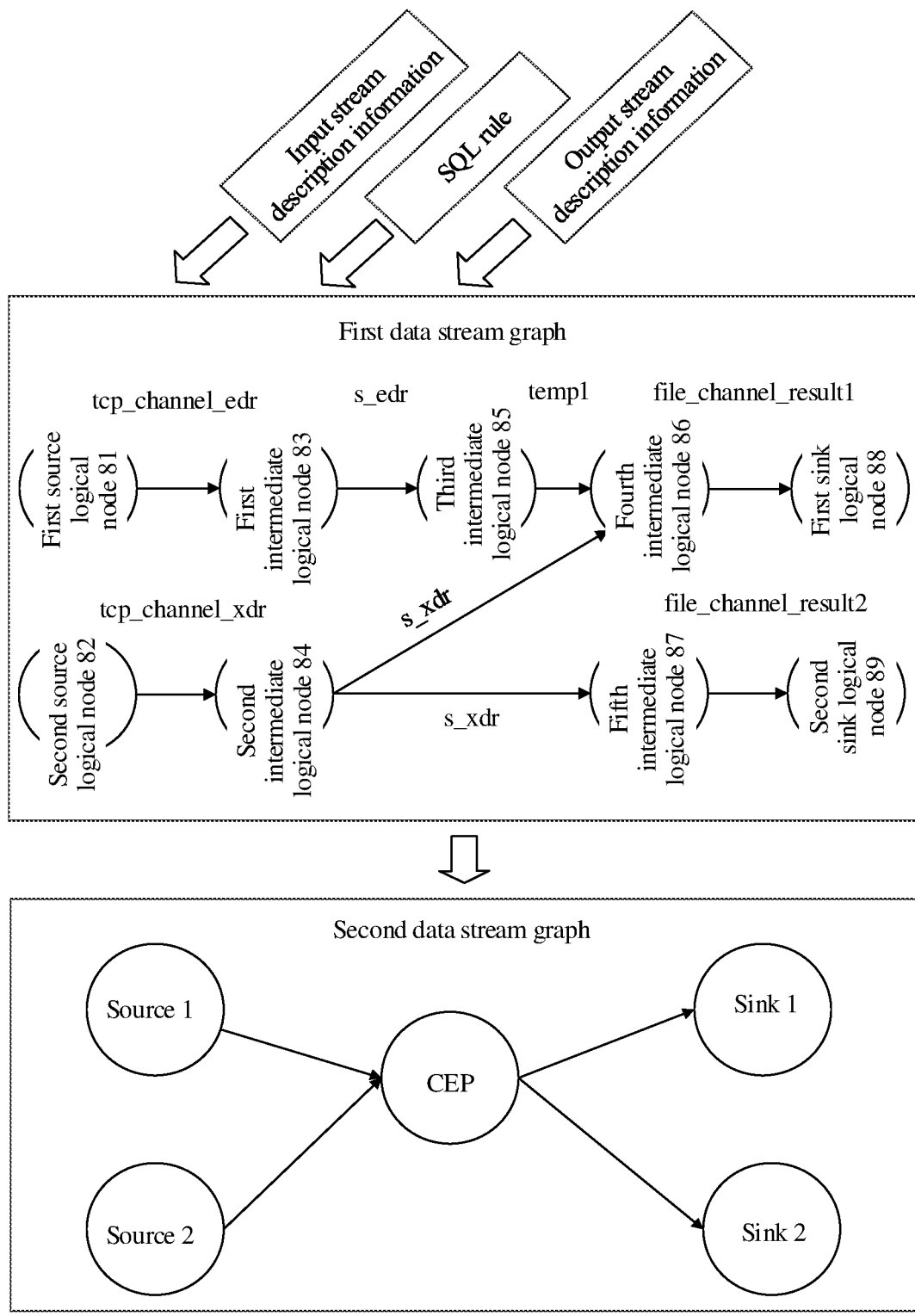
FIG. 8C is a schematic principle diagram of a stream computing method according to another embodiment of the present application.

For example, as shown in FIG. 8C, the first data stream graph includes a first source logical node 81, a second source logical node 82, a first intermediate logical node 83, a second intermediate logical node 84, a third intermediate logical node 85, a fourth intermediate logical node 86, a fifth intermediate logical node 87, a first sink logical node 88, and a second sink logical node 89.

An output data stream tcp_channel_edr of the first source logical node 81 is an input data stream of the first intermediate logical node 83.

An output data stream tcp_channel_xdr of the second source logical node 82 is an input data stream of the second intermediate logical node 84.

An output data stream s_edr of the first intermediate logical node 83 is an input data stream of the third intermediate logical node 85.

An output data stream temp1 of the third intermediate logical node 85 is an input data stream of the fourth intermediate logical node 86.

An output data stream s_xdr of the second intermediate logical node 84 is an input data stream of the fourth intermediate logical node 86.

An output data stream s_xdr of the second intermediate logical node 84 is an input data stream of the fifth intermediate logical node 87.

An output data stream file_channel_result1 of the fourth intermediate logical node 86 is an input data stream of the first sink logical node 88.

An output data stream file_channel_result2 of the fifth intermediate logical node 87 is an input data stream of the second sink logical node 89.

It should be noted that, a sequence of performing step 802, step 803, and step 804 is not limited in this embodiment. Optionally, step 802, step 803, and step 804 are concurrently performed, or step 802, step 803, and step 804 are sequentially performed.

A second data stream graph is an executable stream computing application, and the second data stream graph is a code-level data stream graph. A generation process of the second data stream graph may include step 806 to step 808.

Step 806: The manager node compiles a common source operator to obtain a source operator in a second data stream graph.

Optionally, the manager node selects the common source operator from a preset operator library according to the source logical node, and obtains the source operator in the second data stream graph by means of compilation according to the common source operator.

Optionally, one or more common source operators are set in the preset operator library, for example, a common source operator corresponding to the TCP, a common source operator corresponding to the UDP, a common source operator corresponding to a file type A, a common source operator corresponding to a file type B, a common source operator corresponding to a database type A, and a common source operator corresponding to a database type B.

Optionally, the manager node classifies source logical nodes into one logical node group, and each source logical node is implemented as a source operator.

The manager node selects a corresponding common source operator from the preset operator library according to the source logical node in the first data stream graph for compilation in order to obtain the source operator in the second data stream graph. The source operator is used to receive an input data stream from the data production system.

Step 807: The manager node selects, from a preset operator library, at least one common intermediate operator for each logical node group that includes the intermediate logical node, and compiles the selected common intermediate operator to obtain an intermediate operator in the second data stream graph.

Optionally, the manager node classifies at least one intermediate logical node to obtain several logical node groups, selects, according to intermediate logical nodes that are classified into a same logical node group, a common intermediate operator corresponding to the logical node group from the preset operator library, and obtains the intermediate operator in the second data stream graph by means of compilation according to the common intermediate operator.

Optionally, one or more common intermediate operators are set in the preset operator library, for example, a common intermediate operator used to implement a multiplication operation, a common intermediate operator used to implement a subtraction operation, a common intermediate operator used to implement a sorting operation, and a common intermediate operator used to implement a screening operation. Certainly, a common intermediate operator may have multiple types of functions, that is, the common intermediate operator is an operator with multiple types of computing functions. When a common intermediate operator has multiple types of functions, multiple logical nodes can be implemented on the common intermediate operator.

Because computing types and/or computing amounts of intermediate logical nodes in the first data stream graph are different, the manager node classifies the intermediate logical nodes according to at least one factor of load balance, a concurrence requirement, intimacy between logical nodes, or mutual exclusiveness between logical nodes, and compiles, using a same common intermediate operator in the preset operator library, intermediate logical nodes that are classified into a same logical node group, to obtain an intermediate operator in the second data stream graph.

For example, the manager node classifies two intermediate logical nodes with a small computing amount into a same group. For another example, the manager node classifies an intermediate logical node A, an intermediate logical node B, and an intermediate logical node C into a same group, where an output data stream of the intermediate logical node A is an input data stream of the intermediate logical node B, and an output data stream of the intermediate logical node B is an input data stream of the intermediate logical node C. For still another example, the manager node classifies an intermediate logical node A and an intermediate logical node D that have a same input data stream into a same group.

Step 808: The manager node compiles a common sink operator to obtain a sink operator in the second data stream graph.

Optionally, the manager node selects the common sink operator from the preset operator library according to the sink logical node, and obtains the sink operator in the second data stream graph by means of compilation according to the common sink operator.

Optionally, one or more common sink operators are set in the preset operator library, for example, a common sink operator corresponding to the TCP, a common sink operator corresponding to the UDP, a common sink operator corresponding to a file type A, a common sink operator corresponding to a file type B, a common sink operator corresponding to a database type A, and a common sink operator corresponding to a database type B.

Optionally, the manager node classifies sink logical nodes into one logical node group, and each sink logical node is implemented as a sink operator.

The manager node selects a corresponding common sink operator from the preset operator library according to the sink logical node in the first data stream graph for compilation in order to obtain the sink operator in the second data stream graph. The sink operator is used to send a final output data stream to the data consumption system.

For example, referring to FIG. 8C, the first source logical node 81 in the first data stream graph is compiled using a common source operator to obtain a first source operator Source 1. The second source logical node 82 in the first data stream graph is compiled using a common source operator to obtain a second source operator Source 2. The first intermediate logical node 83 to the fifth intermediate logical node 87 in the first data stream graph are classified into a same group, and are compiled using a same common intermediate operator to obtain an intermediate operator CEP. The first sink logical node in the first data stream graph is compiled using a common sink operator to obtain a first sink operator Sink 1. The second sink logical node in the first data stream graph is compiled using a common sink operator to obtain a second sink operator Sink 2.

Finally, the second data stream graph includes the first source operator Source 1, the second source operator Source 2, the intermediate operator CEP, the first sink operator Sink 1, and the second sink operator Sink 2.

Step 809: The manager node generates directed edges between operators in the second data stream graph according to the directed edge between the source logical node and the intermediate logical node, the directed edge between the intermediate logical nodes, and the directed edge between the intermediate logical node and the sink logical node.

The manager node correspondingly generates the directed edges between the operators in the second data stream graph according to the directed edges in the first data stream graph.

In this case, an executable data stream graph is generated. The data stream graph may be regarded as a stream computing application.

It should be noted that, a sequence of performing step 806, step 807, and step 808 is not limited in this embodiment. Optionally, step 806, step 807, and step 808 are concurrently performed, or step 806, step 807, and step 808 are sequentially performed.

Step 810: The manager node schedules operators in the second data stream graph to at least one worker node in a distributed computing system, where the worker node is configured to execute the operator.

The distributed computing system includes multiple worker nodes, and the manager node schedules, according to a physical execution plan determined by the manager node, the operators in the second data stream graph to the multiple worker nodes for execution. Each worker node is configured to execute at least one operator. Generally, at least one process runs on each worker node, and each process is used to execute one operator.

For example, the first source operator Source 1 is scheduled to a worker node 1, the second source operator Source 2 is scheduled to a worker node 2, the intermediate operator CEP is scheduled to a worker node 3, and the first sink operator Sink 1 and the second sink operator Sink 2 are scheduled to a worker node 4.

To decouple a data stream citation relationship between the operators, a subscription mechanism is further introduced in this embodiment.

Step 811: The manager node generates, according to an output data stream of each operator, subscription publication information corresponding to the operator, and configures the subscription publication information for the operator.

The subscription publication information is used to indicate a publication manner of an output data stream corresponding to a current operator.

The manager node generates, according to the output data stream of the current operator, the directed edge in the second data stream graph, and a topology structure between worker nodes, subscription publication information corresponding to the current operator.

For example, if an output data stream of the first source operator Source 1 is tcp_channel_edr, a directed edge corresponding to tcp_channel_edr in the second data stream graph points to the intermediate operator CEP, and a network interface 3 of the worker node 1 is connected to a network interface 4 of the worker node 3, the manager node generates subscription publication information for publishing the output data stream tcp_channel_edr from the network interface 3 of the worker node 1 in a predetermined form. Then, the manager node delivers the subscription publication information to the first source operator 1 on the worker node 1, and the first source operator Source 1 publishes the output data stream tcp_channel_edr according to the subscription publication information. In this case, the first source operator Source 1 neither needs to care about a specific downstream operator nor needs to care about a worker node on which the downstream operator is located, provided that the output data stream is published from the network interface 3 of the worker node 1 according to the subscription publication information.

Step 812: The manager node generates, according to an input data stream of each operator, input stream definition information corresponding to the operator, and configures the input stream definition information for the operator.

The input stream definition information is used to indicate a receive manner of an input data stream corresponding to the current operator.

The manager node generates, according to the input data stream of the current operator, the directed edge in the second data stream graph, and a topology structure between worker nodes, subscription information corresponding to the current operator.

For example, if an input data stream of the intermediate operator CEP includes tcp_channel_edr, a directed edge corresponding to tcp_channel_edr in the second data stream graph is from the first source operator Source 1, and the network interface 3 of the worker node 1 is connected to the network interface 4 of the worker node 3, the manager node generates the input stream definition information that is received from the network interface 4 in a predetermined form. Then, the manager node delivers the input stream definition information to the intermediate operator CEP on the worker node 3, and the intermediate operator CEP receives the input data stream tcp_channel_edr according to the input stream definition information. In this case, the intermediate operator CEP neither needs to care about a specific upstream operator nor needs to care about a worker node on which the upstream operator is located, provided that the input data stream is received from the network interface 4 of the worker node 3 according to the input stream definition information.

Step 813: The worker node executes each operator in the second data stream graph.

Each worker node executes each operator in the second data stream graph according to scheduling by the manager node. For example, each process is responsible for a computing task of one operator.

In conclusion, according to the stream computing method provided in this embodiment, the manager node generates the executable data stream graph according to the input channel description information, the SQL statement, and the output channel description information, and then the manager node controls, according to the data stream graph, the worker node to perform stream computing. This resolves a problem that overall computing performance of a generated data stream graph is relatively poor because a function of each basic operator is divided at an extremely fine granularity when the data stream graph is constructed in a current stream computing system using the basic operator provided by an IDE. An SQL is a relatively common database management language, and the stream computing system supports the SQL statement in constructing a data stream graph such that usability of constructing the data stream graph by the user using the SQL statement is ensured. In addition, the user uses the SQL statement using a programming language characteristic of the SQL language to define processing logic of the data stream graph, and the manager node dynamically generates the data stream graph with a proper quantity of operators according to the processing logic defined using the SQL statement such that overall computing performance of the data stream graph is improved.

Further, the manager node classifies the multiple logical nodes in the first data stream graph, and implements, using a same common intermediate operator, logical nodes that are classified into a same group. The user does not need to consider factors such as load balance, concurrent execution, intimacy, and mutual exclusiveness, and the manager node determines generation of the second data stream graph according to the factors such as load balance, concurrent execution, intimacy, and mutual exclusiveness such that difficulty of generating the second data stream graph by the user is further reduced, provided that the user is capable of constructing the logic-level first data stream graph using the SQL.

Further, the subscription mechanism is set, and a citation relationship between the input data stream and the output data stream of each operator in the second data stream graph is decoupled such that the user can still dynamically adjust each operator in the second data stream graph in the stream computing system after the second data stream graph is executed, and overall usability and maintainability of the stream computing application are improved.

When the second data stream graph is executed in the stream computing system, and a service function is changed and adjusted in an actual use scenario, the executed second data stream graph also needs to be changed for adapting to a new requirement. Different from the other approaches in which the second data stream graph usually needs to be reconstructed, this embodiment of the present application provides a capability of dynamically modifying the executed second data stream graph. For details, refer to FIG. 8D to FIG. 8F.

Figure 8D:
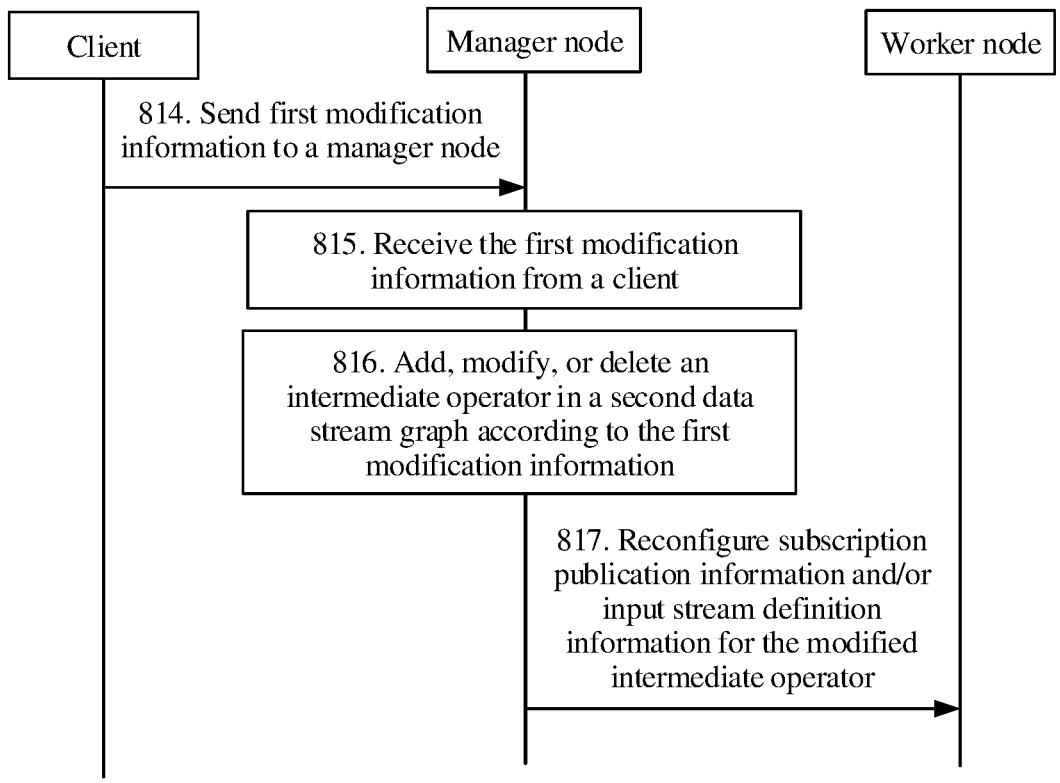
FIG. 8D is a method flowchart of a stream computing method according to another embodiment of the present application.

After the second data stream graph is executed, the user may further modify the intermediate operator in the second data stream graph, as shown in FIG. 8D.

Step 814: The client sends first modification information to the manager node.

The first modification information is information for modifying the SQL rule, or the first modification information carries a modified SQL rule.

If the intermediate operator in the second data stream graph needs to be modified, the client sends, to the manager node, the first modification information that is used to modify the SQL rule.

Step 815: The manager node receives the first modification information from the client.

Step 816: The manager node adds, modifies, or deletes the intermediate operator in the second data stream graph according to the first modification information.

Optionally, in a modification process in which an original intermediate operator is replaced with a new intermediate operator, the original intermediate operator may be deleted, and then the new intermediate operator is added.

Step 817: The manager node reconfigures subscription publication information and/or input stream definition information for the modified intermediate operator.

Optionally, if an input data stream of the modified intermediate operator is a newly added data stream or a changed data stream, the manager node further needs to reconfigure the input stream definition information for the intermediate operator.

If an output data stream of the modified intermediate operator is a newly added data stream or a changed data stream, the manager node further needs to reconfigure the subscription publication information for the intermediate operator.

In conclusion, according to the stream computing method provided in this embodiment, the client sends the first modification information to the manager node, and the manager node adds, modifies, or deletes the intermediate operator in the second data stream graph according to the first modification information such that the manager node can dynamically adjust the intermediate operator in the second data stream graph.

Figure 8E:
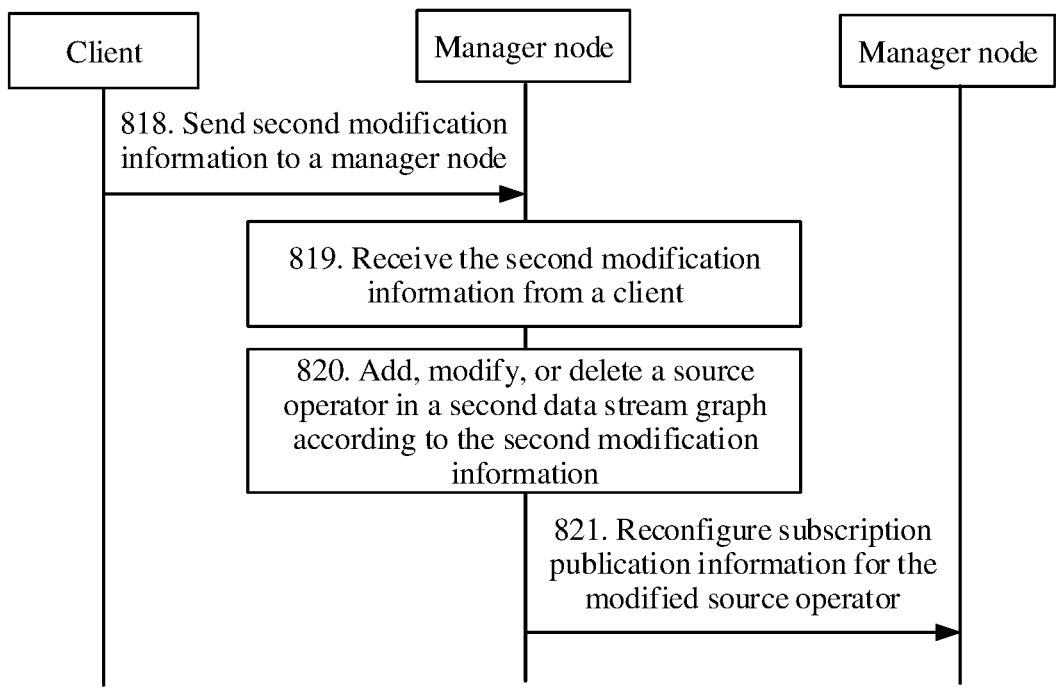
FIG. 8E is a method flowchart of a stream computing method according to another embodiment of the present application.

After the second data stream graph is executed, the user may further modify the source operator in the second data stream graph, as shown in FIG. 8E.

Step 818: The client sends second modification information to the manager node.

The second modification information is information for modifying the input channel description information, or the second modification information carries modified input channel description information.

If the source operator in the second data stream graph needs to be modified, the client sends, to the manager node, the second modification information that is used to modify the input channel description information.

Step 819: The manager node receives the second modification information from the client.

Step 820: The manager node adds, modifies, or deletes the source operator in the second data stream graph according to the second modification information.

Optionally, in a modification process in which an original source operator is replaced with a new source operator, the original source operator may be deleted, and then the new source operator is added.

Step 821: The manager node reconfigures subscription publication information for the modified source operator.

Optionally, if an output data stream of the modified source operator is a newly added data stream or a changed data stream, the manager node further needs to reconfigure the subscription publication information for the source operator.

In conclusion, according to the stream computing method provided in this embodiment, the client sends the second modification information to the manager node, and the manager node adds, modifies, or deletes the source operator in the second data stream graph according to the second modification information such that the manager node can dynamically adjust the source operator in the second data stream graph.

Figure 8F:
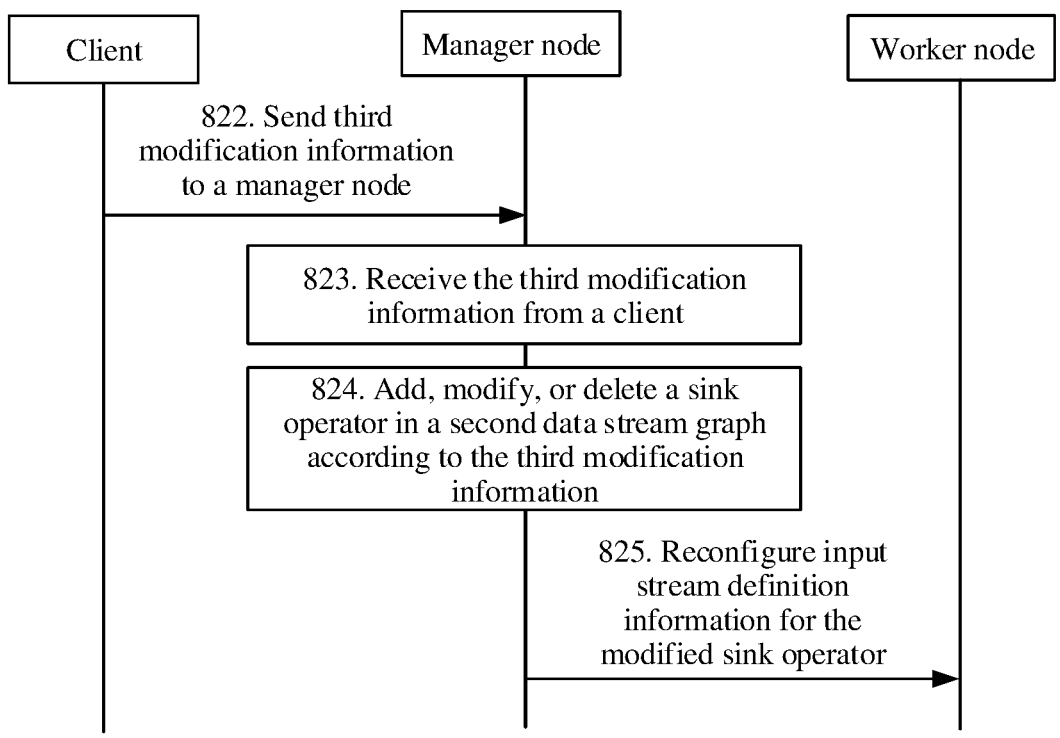
FIG. 8F is a method flowchart of a stream computing method according to another embodiment of the present application.

After the second data stream graph is executed, the user may further modify the sink operator in the second data stream graph, as shown in FIG. 8F.

Step 822: The client sends third modification information to the manager node.

The third modification information is information for modifying the output channel description information, or the third modification information carries modified output channel description information.

If the sink operator in the second data stream graph needs to be modified, the client sends, to the manager node, the third modification information that is used to modify the output channel description information.

Step 823: The manager node receives the third modification information from the client.

Step 824: The manager node adds, modifies, or deletes the sink operator in the second data stream graph according to the third modification information.

Optionally, in a modification process in which an original sink operator is replaced with a new sink operator, the original sink operator may be deleted, and then the new sink operator is added.

Step 825: The manager node reconfigures input stream definition information for the modified sink operator.

Optionally, if an input data stream of the modified sink operator is a newly added data stream or a changed data stream, the manager node further needs to reconfigure the input stream definition information for the sink operator.

In conclusion, according to the stream computing method provided in this embodiment, the client sends the third modification information to the manager node, and the manager node adds, modifies, or deletes the sink operator in the second data stream graph according to the third modification information such that the manager node can dynamically adjust the sink operator in the second data stream graph.

Figure 9A:
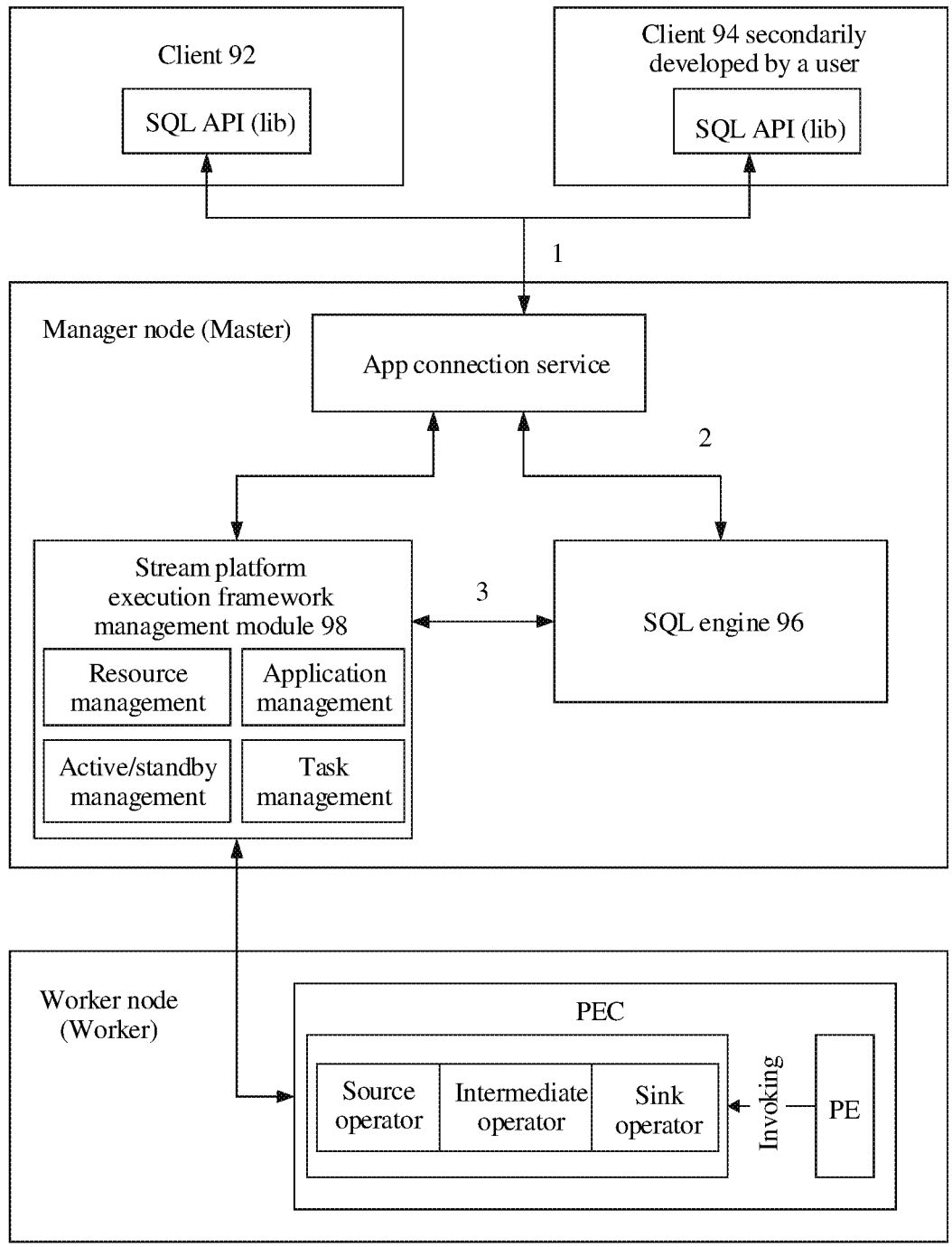
FIG. 9A is a schematic principle diagram of specific implementation of a stream computing method according to an embodiment of the present application.

In a specific embodiment, as shown in FIG. 9A, a stream computing system provides two types of clients for a user an original client 92 provided by the stream computing system and a client 94 secondarily developed by the user. An SQL application programming interface (API) is provided for both the original client 92 and the secondarily developed client 94, and the SQL API is used to implement a function of defining a data stream graph using an SQL language. The user enters input/output channel description information and an SQL statement at the original client 92 or the secondarily developed client 94, and the original client 92 or the secondarily developed client 94 sends the input/output channel description information and the SQL statement to a manager node (Master), that is, step 1 in the diagram.

The manager node (Master) establishes a connection to the original client 92 or the secondarily developed client 94 using an App connection service. The manager node (Master) obtains the input/output channel description information and the SQL statement, and an SQL engine 96 generates an executable data stream graph according to the input/output channel description information and the SQL statement, that is, step 2 in the diagram.

The manager node (Master) further includes a stream platform execution framework management module 98, and the stream platform execution framework management module 98 is configured to implement management transactions such as resource management, application management, active/standby management, and task management. The SQL engine 96 generates an executable data stream graph. The stream platform execution framework management module 98 plans and makes a decision on an execution plan of the data stream graph on each worker node (Worker), that is, step 3 in the diagram.

A processing element container (PEC) on each worker node (Worker) includes multiple processing elements (PEs), and each PE is configured to invoke a source operator, or an intermediate operator CEP, or a sink operator in the executable data stream graph. Each operator in the executable data stream graph is processed by means of coordination between PEs.

Figure 9B:
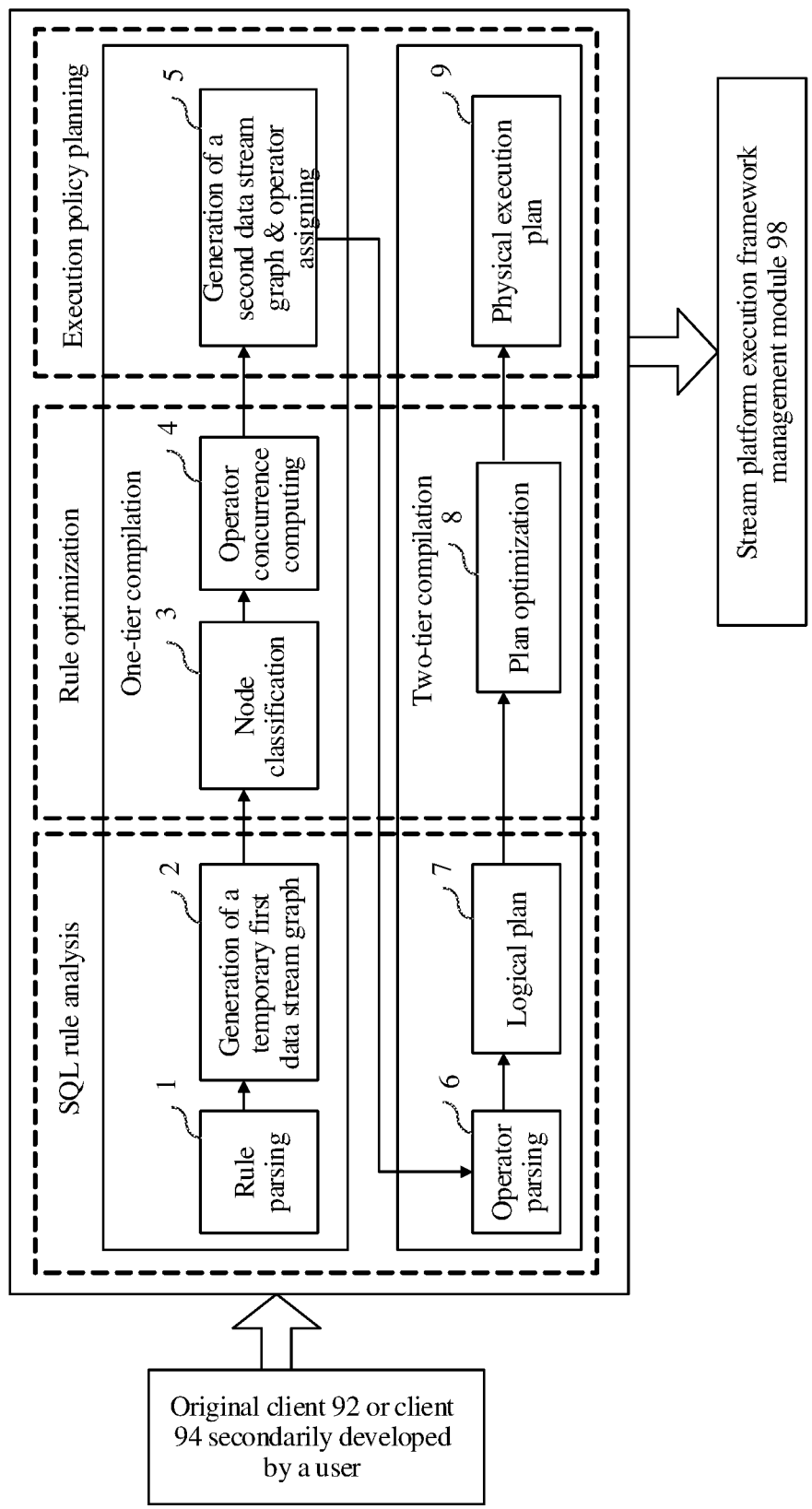
FIG. 9B is a schematic principle diagram of specific implementation of a stream computing method according to another embodiment of the present application.

FIG. 9B shows a schematic principle diagram of specific implementation of an SQL engine 96 according to an embodiment of the present application. After obtaining input/output channel description information and an SQL statement, the SQL engine 96 performs the following processes:

1. The SQL engine 96 parses each SQL rule in the SQL statement. 2. The SQL engine 96 generates a temporary first data stream graph according to a result of the parsing. 3. The SQL engine 96 classifies logical nodes in the first data stream graph according to factors such as load balance, intimacy, and mutual exclusiveness to obtain at least one logical node group, where each logical node group includes one or more logical nodes. 4. The SQL engine 96 simulates operator concurrence computing, and adjusts each logical node group according to a result of the simulating operator concurrence computing. 5. The SQL engine 96 generates a second data stream graph according to the adjusted logical node group, and assigns, to an executable operator in the second data stream graph, logical nodes that are classified into a same logical node group. 6. The SQL engine 96 parses each executable operator in the second data stream graph, and analyzes information such as a computing requirement of each operator. 7. The SQL engine 96 generates a logical execution plan for each executable operator in the second data stream graph. 8. The SQL engine 96 performs code editing optimization on the logical execution plan of the second data stream graph, and generates a physical execution plan. 9. The SQL engine 96 sends the physical execution plan to the stream platform execution framework management module 98, and the stream platform execution framework management module 98 executes a stream computing application according to the physical execution plan.

Step 1 to step 5 belong to a one-tier compilation process, and step 6 to step 9 belong to a two-tier compilation process.

The following describes an apparatus embodiment of the present application, and the apparatus embodiment corresponds to the foregoing method embodiment. For details not described in detail in the apparatus embodiment, refer to the description in the foregoing method embodiment.

Figure 10:
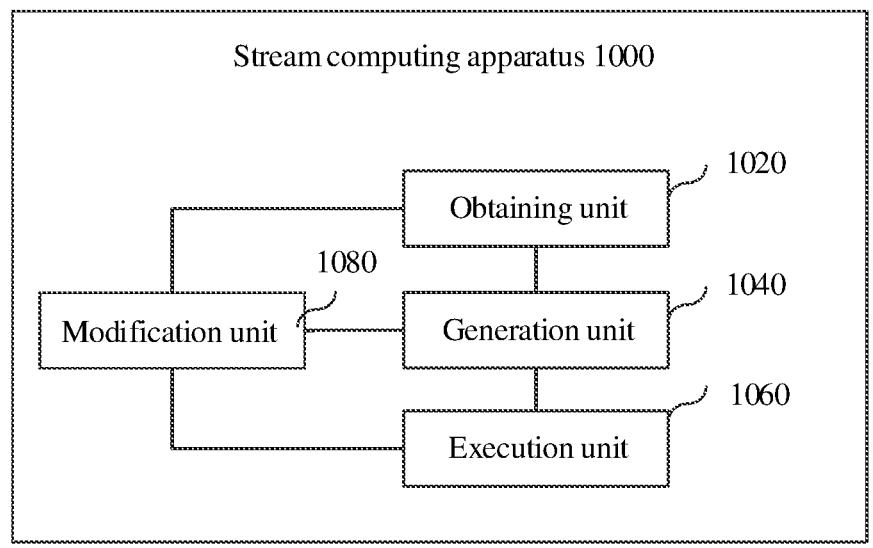
FIG. 10 is a structural block diagram of a stream computing apparatus according to another embodiment of the present application.

FIG. 10 shows a structural block diagram of a stream computing apparatus 1000 according to an embodiment of the present application. The stream computing apparatus 1000 may be implemented as all or a part of a manager node 240 using a special-purpose hardware circuit or a combination of software and hardware. The stream computing apparatus 1000 includes an obtaining unit 1020, a generation unit 1040, and an execution unit 1060.

The obtaining unit 1020 is configured to implement functions of step 501 and step 801.

The generation unit 1040 is configured to implement functions of step 502, step 502a, step 502b, and step 802 to step 808.

The execution unit 1060 is configured to implement functions of step 503, and step 810 to step 812.

Optionally, the apparatus further includes a modification unit 1080.

The modification unit 1080 is configured to implement functions of step 815 to step 825.

For related details, refer to the method embodiments in FIG. 5, FIG. 6, FIG. 7, FIG. 8A, FIG. 8B, FIG. 8C, FIG. 8D, FIG. 8E, and FIG. 8F.

Optionally, the obtaining unit 1020 is implemented by executing an obtaining module 251 in a memory 244 using a network interface 242 and a processor 241 of the manager node 240. The network interface 242 is an Ethernet network interface card, an optical fiber transceiver, a universal serial bus (USB) interface, or another I/O interface.

Optionally, the generation unit 1040 is implemented by executing a generation module 252 in the memory 244 using the processor 241 of the manager node 240. A data stream graph generated by the generation unit 1040 is an executable distributed stream computing application including multiple operators, and the operators in the distributed stream computing application may be assigned to different worker nodes for execution.

Optionally, the execution unit 1060 is implemented by executing an execution module 253 in the memory 244 using the network interface 242 and the processor 241 of the manager node 240. The network interface 242 is an Ethernet network interface card, an optical fiber transceiver, a USB interface, or another I/O interface. The processor 241 assigns the operators in the data stream graph to different worker nodes using the network interface 242, and then the worker nodes perform data computing on the operators.

Optionally, the modification unit 1080 is implemented by executing a modification module (not shown in the diagram) in the memory 244 using the processor 241 of the manager node 240.

It should be noted that, when the stream computing apparatus provided in this embodiment generates the data stream graph and performs stream computing, division of the function modules is merely used as an example for description. In practical application, the functions may be allocated to different function modules for completion according to a requirement, that is, an internal structure of a device is divided into different function modules to complete all or some of the functions described above. In addition, the stream computing apparatus provided in the foregoing embodiment pertains to a same concept as the method embodiment of the stream computing method. For a specific implementation process of the stream computing apparatus, refer to the method embodiment. Details are not described herein again.

Figure 11:
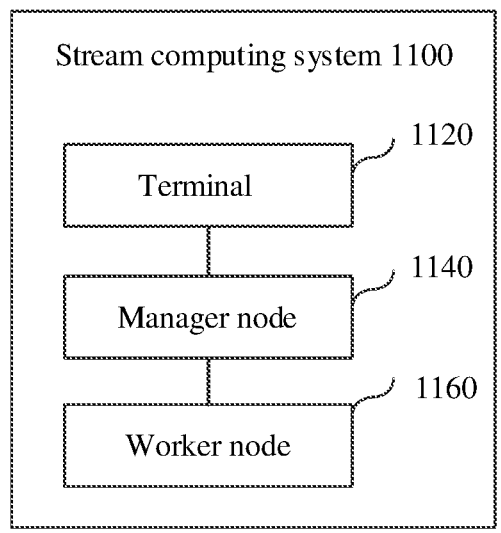
FIG. 11 is a structural block diagram of a stream computing system according to another embodiment of the present application.

FIG. 11 shows a structural block diagram of a stream computing system 1100 according to an embodiment of the present application. The stream computing system 1100 includes a terminal 1120, a manager node 1140, and a worker node 1160.

The terminal 1120 is configured to perform the steps performed by the terminal or the client in the foregoing method embodiment.

The manager node 1140 is configured to perform the steps performed by the manager node in the foregoing method embodiment.

The worker node 1160 is configured to perform the steps performed by the worker node in the foregoing method embodiment.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a ROM, a magnetic disk, or an optical disc.

What is claimed is:

1. A stream computing method, wherein the stream computing method is applied to a stream computing system comprising a manager node and a worker node, and wherein the stream computing method comprises:
    obtaining, by the manager node, input channel description information, a structured query language (SQL) statement, and output channel description information from a client;
    generating, by the manager node, a data stream graph according to the input channel description information, the SQL statement, and the output channel description information, wherein the data stream graph defines computational logic of a plurality of operators for executing a stream computing task and a data stream input/output relationship among the operators, wherein the SQL statement comprises a plurality of SQL rules, wherein each SQL rule comprises at least one SQL substatement, and wherein generating the data stream graph comprises:
        generating, by the manager node, a first data stream graph according to the input channel description information, the SQL rules, and the output channel description information, wherein the first data stream graph comprises a plurality of logical nodes;
        classifying, by the manager node, the logical nodes in the first data stream graph to obtain a plurality of logical node groups;
        selecting, by the manager node, a common operator corresponding to each logical node group from a preset operator library; and
        generating, by the manager node, a second data stream graph according to the selected common operator, wherein each operator in the second data stream graph implements functions of one or more logical nodes in a logical node group corresponding to the operator; and
    controlling, by the manager node according to the data stream graph, the worker node to execute the stream computing task, wherein the input channel description information defines an input channel, wherein the input channel is a logical channel inputting a data stream from a data production system to the data stream graph, wherein the output channel description information defines an output channel, and wherein the output channel is a logical channel outputting an output data stream of the data stream graph to a data consumption system.

2. The stream computing method of claim 1, wherein the first data stream graph comprises a source logical node, an intermediate logical node, and a sink logical node coupled using first directed edges, and wherein the second data stream graph comprises a source operator, an intermediate operator, and a sink operator coupled using second directed edges.

3. The stream computing method of claim 2, wherein generating the first data stream graph comprises:
    generating, by the manager node, the source logical node in the first data stream graph according to the input channel description information, wherein the source logical node receives an input data stream from the data production system;
    generating, by the manager node, the intermediate logical node in the first data stream graph according to a select substatement in each SQL rule, wherein the intermediate logical node indicates computational logic for computing the input data stream, and wherein each intermediate logical node corresponds to one SQL rule;
    generating, by the manager node, the sink logical node in the first data stream graph according to the output channel description information, wherein the sink logical node sends the output data stream to the data consumption system; and
    generating, by the manager node, the first directed edges among the source logical node, the intermediate logical node, and the sink logical node according to an input substatement or an output substatement in each SQL rule.

4. The stream computing method of claim 2, wherein the preset operator library comprises a common source operator, a common intermediate operator, and a common sink operator, and wherein selecting the common operator corresponding to each logical node group from the preset operator library and generating the second data stream graph according to the selected common operator comprises:

compiling, by the manager node, the common source operator to obtain the source operator in the second data stream graph;

selecting, by the manager node from the preset operator library, at least one common intermediate operator for each logical node group;

compiling, by the manager node, the selected at least one common intermediate operator to obtain the intermediate operator in the second data stream graph;

compiling, by the manager node, the common sink operator to obtain the sink operator in the second data stream graph; and generating, by the manager node, the second directed edges among operators in the second data stream graph according to the first directed edges among the source logical node, the intermediate logical node, and the sink logical node.

5. The stream computing method of claim 4, further comprising:

receiving, by the manager node from the client, first modification information for modifying an SQL rule; and adding, modifying, or deleting, by the manager node, a corresponding intermediate operator in the second data stream graph according to the first modification information.

6. The stream computing method of claim 4, further comprising:

receiving, by the manager node from the client, second modification information for modifying the input channel description information; and adding, modifying, or deleting the source operator in the second data stream graph according to the second modification information.

7. The stream computing method of claim 4, further comprising:

receiving, by the manager node from the client, third modification information for modifying the output channel description information; and adding, modifying, or deleting the sink operator in the second data stream graph according to the third modification information.

8. The stream computing method of claim 1, wherein the stream computing system comprises a plurality of worker nodes, and wherein controlling the worker node to execute the stream computing task comprises:

scheduling, by the manager node, each operator in the second data stream graph to at least one worker node in the stream computing system, wherein the at least one worker node is configured to execute the operator;

generating, by the manager node according to an output data stream of each operator, subscription publication information corresponding to the operator;

configuring, by the manager node, the subscription publication information for the operator;

generating, by the manager node according to an input data stream of each operator, input stream definition information corresponding to the operator; and configuring, by the manager node, the input stream definition information for the operator, wherein the subscription publication information indicates a manner of sending an output data stream corresponding to the operator, and wherein the input stream definition information indicates a manner of receiving an input data stream corresponding to the operator.

9. A manager node, comprising:

a memory storing instructions; and a processor coupled to the memory, wherein the instructions stored in the memory cause the processor to be configured to:

obtain input channel description information, a structured query language (SQL) statement, and output channel description information from a client;

generate a data stream graph according to the input channel description information, the SQL statement, and the output channel description information, wherein the data stream graph defines computational logic of a plurality of operators for executing a stream computing task and a data stream input/output relationship among the operators, wherein the SQL statement comprises a plurality of SQL rules, wherein each SQL rule comprises at least one SQL substatement, and wherein, to generate the data stream graph, the instructions further cause the processor to be configured to:

generate a first data stream graph according to the input channel description information, the SQL rules, and the output channel description information, wherein the first data stream graph comprises a plurality of logical nodes;

classify the logical nodes in the first data stream graph to obtain a plurality of logical node groups;

select a common operator corresponding to each logical node group from a preset operator library; and generate a second data stream graph according to the selected common operator, wherein each operator in the second data stream graph implements functions of one or more logical nodes in a logical node group corresponding to the operator; and control, according to the data stream graph, a worker node in a stream computing system to execute the stream computing task, wherein the input channel description information defines an input channel, wherein the input channel is a logical channel inputting a data stream from a data production system to the data stream graph, wherein the output channel description information defines an output channel, and wherein the output channel is a logical channel outputting an output data stream of the data stream graph to a data consumption system.

10. The manager node of claim 9, wherein the first data stream graph comprises a source logical node, an intermediate logical node, and a sink logical node coupled using first directed edges, and wherein the second data stream graph comprises a source operator, an intermediate operator, and a sink operator coupled using second directed edges.

11. The manager node of claim 10, wherein the instructions further cause the processor to be configured to:

generate the source logical node in the first data stream graph according to the input channel description information, wherein the source logical node receives an input data stream from the data production system;

generate the intermediate logical node in the first data stream graph according to a select substatement in each SQL rule, wherein the intermediate logical node indicates computational logic for computing the input data stream, and wherein each intermediate logical node corresponds to one SQL rule;

generate the sink logical node in the first data stream graph according to the output channel description information, wherein the sink logical node sends the output data stream to the data consumption system; and generate the first directed edges among the source logical node, the intermediate logical node, and the sink logical node according to an input substatement or an output substatement in each SQL rule.

12. The manager node of claim 10, wherein the preset operator library comprises a common source operator, a common intermediate operator, and a common sink operator, and wherein the instructions further cause the processor to be configured to:
compile the common source operator to obtain the source operator in the second data stream graph;
select, from the preset operator library, at least one common intermediate operator for each logical node group;
compile the selected at least one common intermediate operator to obtain the intermediate operator in the second data stream graph;
compile the common sink operator to obtain the sink operator in the second data stream graph; and
generate the second directed edges among operators in the second data stream graph according to the first directed edges among the source logical node, the intermediate logical node, and the sink logical node.

13. The manager node of claim 12, wherein the instructions further cause the processor to be configured to:
receive, from the client, first modification information for modifying an SQL rule; and
add, modify, or delete a corresponding intermediate operator in the second data stream graph according to the first modification information.

14. The manager node of claim 11, wherein the instructions further cause the processor to be configured to:
receive, from the client, second modification information for modifying the input channel description information; and
add, modify, or delete the source operator in the second data stream graph according to the second modification information.

15. The manager node of claim 11, wherein the instructions further cause the processor to be configured to:
receive, from the client, third modification information for modifying the output channel description information; and
add, modify, or delete the sink operator in the second data stream graph according to the third modification information.

16. The manager node of claim 9, wherein the instructions further cause the processor to be configured to schedule each operator in the second data stream graph to at least one worker node in the stream computing system.

17. A non-transitory computer readable storage medium storing a program, in which, when executed by a processor, cause the processor to:
obtain input channel description information, a structured query language (SQL) statement, and output channel description information from a client;
generate a data stream graph according to the input channel description information, the SQL statement, and the output channel description information, wherein the data stream graph defines computational logic of a plurality of operators for executing a stream computing task and a data stream input/output relationship among the operators, and wherein, to generate the data stream graph, the program further causes the processor to:
generate a first data stream graph according to the input channel description information, the SQL rules, and the output channel description information, wherein the first data stream graph comprises a plurality of logical nodes;
classify the logical nodes in the first data stream graph to obtain a plurality of logical node groups;
select a common operator corresponding to each logical node group from a preset operator library; and
generate a second data stream graph according to the selected common operator, wherein each operator in the second data stream graph implements functions of one or more logical nodes in a logical node group corresponding to the operator; and
control, according to the data stream graph, a worker node to execute the stream computing task, wherein the input channel description information defines an input channel, wherein the input channel is a logical channel inputting a data stream from a data production system to the data stream graph, wherein the output channel description information defines an output channel, and wherein the output channel is a logical channel outputting an output data stream of the data stream graph to a data consumption system.

18. The non-transitory computer readable storage medium of claim 17, wherein the first data stream graph comprises a source logical node, an intermediate logical node, and a sink logical node coupled using first directed edges, and wherein the second data stream graph comprises a source operator, an intermediate operator, and a sink operator coupled using second directed edges.

* * * * *